United States Patent
Kim et al.

(10) Patent No.: US 9,357,462 B2
(45) Date of Patent: May 31, 2016

(54) APPARATUS AND METHOD FOR CHANGING SERVING CELL IN A HIGH SPEED WIRELESS COMMUNICATION SYSTEM

(75) Inventors: Jin-Ik Kim, Yongin-si (KR); Yun-Seok Hwang, Yongin-si (KR); Soo-Yeul Oh, Seongnam-si (KR); Pyeong-Hwan Wee, Seoul (KR); Jae-Yeong Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 821 days.

(21) Appl. No.: 12/653,993

(22) Filed: Dec. 22, 2009

(65) Prior Publication Data

US 2010/0157945 A1 Jun. 24, 2010

(30) Foreign Application Priority Data

Dec. 24, 2008 (KR) .......................... 10-2008-0133057
Dec. 16, 2009 (KR) .......................... 10-2009-0125560

(51) Int. Cl.
 H04W 4/00 (2009.01)
 H04W 36/00 (2009.01)
 H04W 36/18 (2009.01)

(52) U.S. Cl.
 CPC .................................. *H04W 36/18* (2013.01)

(58) Field of Classification Search
 CPC .................................................... H04W 36/18
 USPC ............................ 370/331–334; 455/436–444
 See application file for complete search history.

(56) References Cited

U.S. PATENT DOCUMENTS

| | | | | |
|---|---|---|---|---|
| 6,085,108 | A * | 7/2000 | Knutsson et al. | 455/522 |
| 6,134,444 | A * | 10/2000 | Kotzin | 455/453 |
| 6,985,736 | B1 * | 1/2006 | Aalto | 455/447 |
| 7,248,875 | B2 * | 7/2007 | Schreuder et al. | 455/442 |
| 8,050,683 | B2 * | 11/2011 | Brueck et al. | 455/438 |
| 2002/0068566 | A1 | 6/2002 | Ohlsson et al. | 455/436 |
| 2003/0224733 | A1 * | 12/2003 | Schwarz et al. | 455/67.11 |
| 2005/0070285 | A1 * | 3/2005 | Goransson | 455/436 |
| 2005/0094600 | A1 * | 5/2005 | Zhang et al. | 370/331 |
| 2005/0221825 | A1 * | 10/2005 | Osugi | 455/436 |
| 2005/0249164 | A1 * | 11/2005 | Kwak et al. | 370/335 |
| 2005/0277415 | A1 * | 12/2005 | Hamalainen et al. | 455/436 |
| 2005/0277419 | A1 * | 12/2005 | Takano et al. | 455/442 |
| 2006/0040668 | A1 * | 2/2006 | Hokao | 455/437 |
| 2006/0040669 | A1 * | 2/2006 | Innami | 455/442 |
| 2006/0099915 | A1 * | 5/2006 | Laroia et al. | 455/101 |
| 2007/0165537 | A1 * | 7/2007 | Magnusson et al. | 370/254 |
| 2007/0171867 | A1 * | 7/2007 | Kim | 370/331 |
| 2007/0249355 | A1 * | 10/2007 | Kang et al. | 455/439 |

(Continued)

FOREIGN PATENT DOCUMENTS

WO   WO 2005120183 A2 * 12/2005

*Primary Examiner* — Thai Hoang

(57) ABSTRACT

A Radio Network Controller (RNC) in a high speed wireless communication system includes an apparatus to perform method for changing a serving cell in the high speed wireless communication system. The RNC receives UpLink (UL) cell change determination information representing UL channel states from a serving Base Station (BS) and a target BS. The UL is received if a UL soft handover of a Mobile Station (MS) is initiated depending on a DownLink (DL) channel quality of the MS. The RNC can determine UL cell change timing of the MS using the UL cell change determination information. Thereafter, the RNC can send an instruction of a UL cell change of the MS to the serving BS and the target BS.

4 Claims, 12 Drawing Sheets

(56) References Cited

U.S. PATENT DOCUMENTS

2008/0085708 A1* 4/2008 Kogure .................. 455/436
2009/0129342 A1* 5/2009 Hwang et al. ............ 370/331
2009/0280816 A1* 11/2009 Unno et al. .............. 455/440
2009/0286563 A1* 11/2009 Ji et al. ................... 455/501
2010/0067481 A1* 3/2010 Maeda .................... 370/331
2011/0098076 A1* 4/2011 Kim et al. ................ 455/522

* cited by examiner

APPARATUS AND METHOD FOR CHANGING SERVING CELL IN A HIGH SPEED WIRELESS COMMUNICATION SYSTEM

CROSS-REFERENCE TO RELATED APPLICATION(S) AND CLAIM OF PRIORITY

The present application claims priority under 35 U.S.C. §119(a) to a Korean Patent Applications filed in the Korean Intellectual Property Office on Dec. 24, 2008 which is assigned Serial No. 10-2008-0133057, and on Dec. 16, 2009 which is assigned Serial No. 10-2009-0125560, the contents of which are herein incorporated by reference.

TECHNICAL FIELD OF THE INVENTION

The present invention relates to a high speed wireless communication system. More particularly, the present invention relates to an apparatus and method for changing a serving cell in a high speed wireless communication system.

BACKGROUND OF THE INVENTION

In a wireless communication system, handover is an essential technology for providing a seamless service to a Mobile Station (MS) that moves between Base Stations (BSs). Thus, handover is also supported by a High Speed Packet Access (HSPA) system, which is a Wideband Code Division Multiple Access (WCDMA) communication system that is a widely used communication technology. Handover in the HSPA system is described below. An MS measures a DownLink (DL) subcarrier energy to noise power ratio (hereinafter, referred to as "Ec/No"), and successively performs handover for a data channel and a control channel depending on a difference between an Ec/No of a target cell and an Ec/No of a serving cell.

That is, in the HSPA system, the DL Ec/No is a criterion for handover. More particularly, at timing when the difference between the Ec/No of the target cell and the Ec/No of the serving cell is lowered to predefined threshold or less, the MS reports the Ec/No measurement result, and performs handover for Dedicated Physical Channel (DPCH) and channels related to E-DCH (Enhanced Dedicated Channel) expect E-AGCH (E-DCH Absolute Grant Channel). Additionally, at timing when the difference between the Ec/No of the target cell and the Ec/No of the serving cell is substantially similar to '0', the MS reports the Ec/No measurement result and, according to a control of a Radio Network Controller (RNC), performs handover for all DL channels of a High Speed Shared Control Channel (HS-SCCH), a High Speed Physical Downlink Shared Channel (HS-PDSCH), and so forth, and E-AGCH which is one of UpLink (UL) channels.

As described above, in an HSPA system, handover for UL channels and handover for DL channels are all performed on the basis of a DL Ec/No. In other words, the handover for the UL channels is performed considering only a DL wireless environment excepting a UL wireless environment. However, in the real wireless environment, it frequently occurs that UL coverage and DL coverage are not the same as each other. Thus, there is a problem that the handover for the UL channels is performed at improper timing because the handover for the UL channels is performed on the basis of the DL wireless environment.

SUMMARY OF THE INVENTION

To address the above-discussed deficiencies of the prior art, a primary aspect of the present invention is to provide an apparatus and method for preventing a quality of communication from being deteriorated due to an UpLink (UL) handover of improper timing in a high speed wireless communication system.

Another aspect of the present invention is to provide an apparatus and method for performing a UL handover depending on a UL wireless environment in a high speed wireless communication system.

A further aspect of the present invention is to provide an apparatus and method for determining UL cell change timing depending on a success or failure of reception of UL packets in a high speed wireless communication system.

Yet another aspect of the present invention is to provide an apparatus and method for determining UL cell change timing depending on a UL Signal to Interference Ratio (SIR) in a high speed wireless communication system.

The above aspects are achieved by providing an apparatus and method for changing a serving cell in a high speed wireless communication system.

According to one aspect of the present invention, an operation method of a Radio Network Controller (RNC) in a high speed wireless communication system is provided. The method includes receiving UL cell change determination information representing UL channel states from a serving Base Station (BS) and a target BS if a UL soft handover of a Mobile Station (MS) is initiated depending on a DownLink (DL) channel quality of the MS, determining UL cell change timing of the MS using the UL cell change determination information, and sending an instruction of a UL cell change of the MS to the serving BS and the target BS.

According to another aspect of the present invention, an operation method of a BS in a high speed wireless communication system is provided. The method includes generating UL cell change determination information representing a UL channel state of an MS if a UL soft handover of the MS is initiated depending on a DL channel quality of the MS, reporting the UL cell change determination information to an RNC, and performing a UL cell change procedure of the MS if a UL cell change is instructed from the RNC.

According to a further aspect of the present invention, an RNC apparatus in a high speed wireless communication system is provided. The apparatus includes a communicator and a controller. The communicator receives UL cell change determination information representing UL channel states from a serving BS and a target BS if a UL soft handover of an MS is initiated depending on a DL channel quality of the MS. The controller determines UL cell change timing of the MS using the UL cell change determination information, and sends an instruction of a UL cell change of the MS to the serving BS and the target BS.

According to a yet another aspect of the present invention, a BS apparatus in a high speed wireless communication system is provided. The apparatus includes a controller and a communicator. The controller generates UL cell change determination information representing a UL channel state of the MS if a UL soft handover of an MS is initiated depending on a DL channel quality of the MS. The communicator reports the UL cell change determination information to an RNC. The controller performs a UL cell change procedure of the MS if a UL cell change is instructed from the RNC.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system A technology for performing an UpLink (UL) cell change depending on a UL wireless environment aside a DownLink (DL) handover in a high speed wireless communication system according to an exemplary embodiment of the present invention is described below. An exemplary embodiment of the present invention describes, for example, a Wideband Code Division Multiple Access (WCDMA) wireless communication system, and is identically applicable even to other wireless communication systems.

Figure 1:
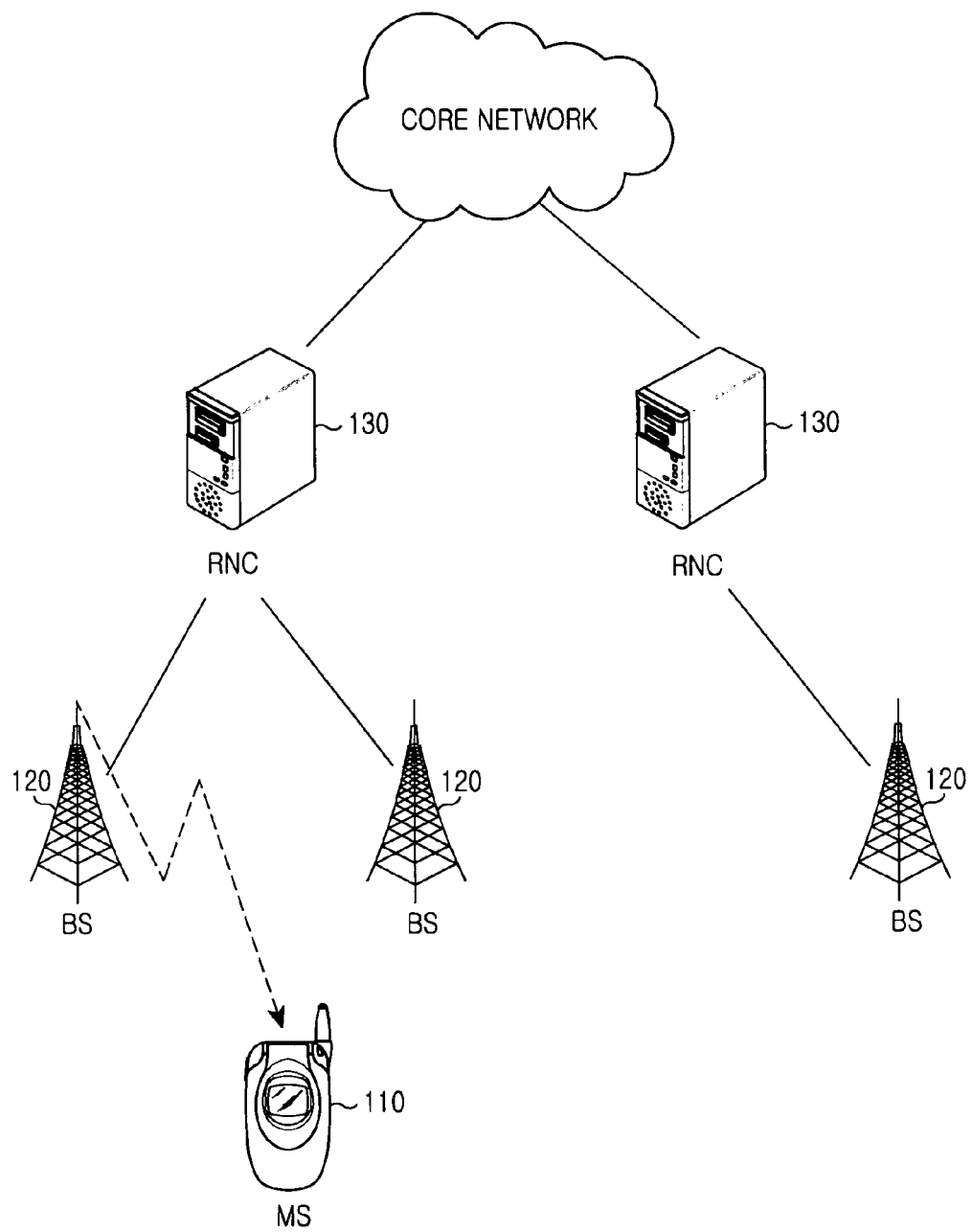
FIG. 1 illustrates a schematic construction of a high speed wireless communication system according to an exemplary embodiment of the present invention.

FIG. 1 illustrates a schematic construction of a high speed wireless communication system according to an exemplary embodiment of the present invention. Referring to FIG. 1, the high speed wireless communication system includes Mobile Stations (MSs) 110, Base Stations (BSs) 120, and Radio Network Controllers (RNCs) 130. The MS 110 is a mobile user equipment, and performs communication with the BS 120 through a wireless channel. The BSs 120 take charge of wireless access of the MS 110. The RNC 130 controls the BSs 120, controls a handover procedure of the MS 110, and takes charge of service connection through a Core Network (CN). As the MS 110 moves, a serving BS connecting with the MS 110 may be changed. The change of the serving BS is made through handover.

A handover scheme determines cell change timing of DL channels and UL channels on the basis of each wireless environment and then, performs cell changes at separate timing, respectively. In other words, a DL cell change is performed at timing when a DL Ec/No of a serving cell is less than a DL Ec/No of a target cell, and a UL cell change is made at timing when the following requirements are met.

In the following description of the present invention, EVENT1A, EVENT1D, and EVENT1B denote conditions based on a comparison state between an Ec/No of a serving cell and an Ec/No of a target cell. EVENT1A denotes conditions of, during a predetermined time, maintaining a state where a level of an Ec/No of the serving cell greater than an Ec/No of the target cell is equal to or is less than a first threshold value. EVENT1D denotes conditions of, during a predetermined time, maintaining a state where an Ec/No of the serving cell is similar with an Ec/No of the target cell, that is, a state where a difference between the Ec/No of the serving cell and the Ec/No of the target cell is equal to or is less than a second threshold value. EVENT1B denotes conditions of, during a predetermined time, maintaining a state where a level of an Ec/No of the target cell greater than an Ec/No of the serving cell is equal to or is less than a third threshold value.

Figure 2:
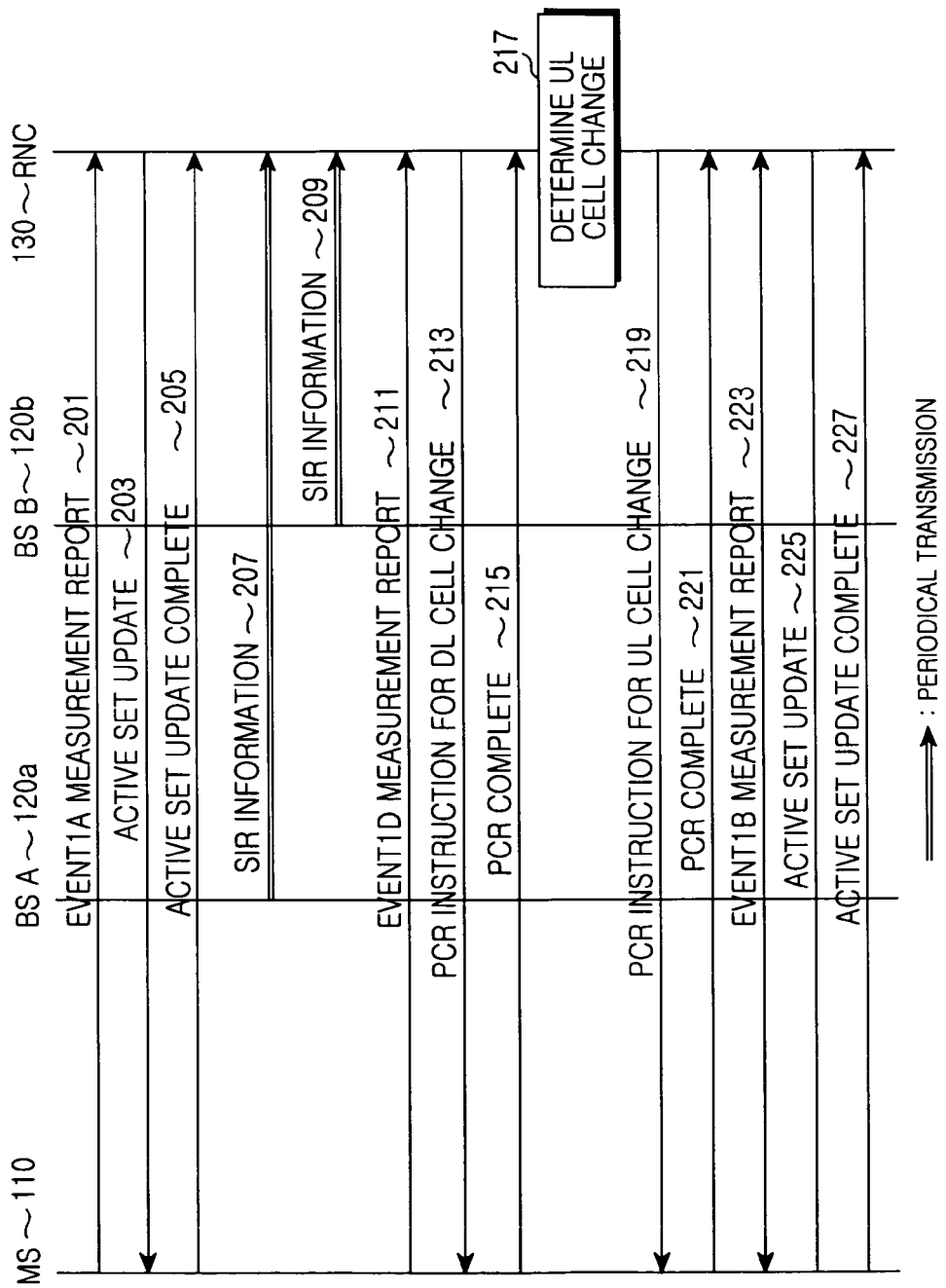
FIG. 2 illustrates a ladder diagram of a signal exchange for cell change in a high speed wireless communication system according to a first exemplary embodiment of the present invention.

FIG. 2 illustrates a signal exchange for handover according to a first exemplary embodiment of the present invention. FIG. 2 illustrates a process of changing a serving BS from a BS A to a BS B.

Referring to FIG. 2, in step 201, upon recognizing the occurrence of EVENT1A, an MS 110 sends an EVENT1A measurement report message to an RNC. That is, as recognizing the occurrence of EVENT1A, the MS 110 acquires a link with the BS B 120b, and reports the occurrence of EVENT1A to the RNC 130.

Thus, in step 203, the RNC 130 sends an active set update message to the MS 110. Here, the active set implies a set of BSs with which the MS 110 can have links, namely, receive signals from. That is, as receiving the report of the occurrence of EVENT1A, the RNC 130 determines that the MS 110 needs to perform handover, and sends the MS 110 the active set update message instructing to set a link of the BS B 120b, namely, instructing to include the BS B 120b in the active set. The active set update message includes a channelization code for the BS B 120b, a scrambling code, and the like. At this time, although not illustrated, the RNC 130 instructs the BS B 120b to allocate the MS 110 a new link and then, if its completion is reported, the RNC 130 sends the active set update message to the MS 110.

In step 205, after updating the active set to indicate that the active set update message has been received, the MS 110 sends an active set update complete message to the RNC 130. That is, the MS 110 acquires the link with the BS B 120b by including the BS B 120b in the active set of the MS 110, and maintains both a link with the BS A 120a and the link with the BS B 120b. Here, the link with the BS A 120a and link with the BS B 120b include a control channel and an UL channel. Additionally, to report an active set update completion to the RNC 130, the MS 110 sends the active set update complete message to the RNC 130. By acquiring the link with the BS B 120b through steps 201 to 205, the MS 110 initiates a soft handover.

In steps 207 and 209, the BS A 120a and BS B 120b, initiating the soft handover, periodically measure a UL SIR of the MS 110, and transmit the SIR information to the RNC 130. Although not illustrated in FIG. 2, the BS A 120a and the BS B 120b periodically transmit the SIR information until before a UL cell change is made.

After that, in step 211, upon recognizing the occurrence of EVENT1D, the MS 110 sends an EVENT1D measurement report message to the RNC 130. That is, as recognizing the occurrence of EVENT1D, the MS 110 recognizes a similarity between a channel with the BS B 120b and a channel with the BS A 120a and, to report this, the MS 110 sends the EVENT1D measurement report message to the RNC 130.

Thus, in step 213, the RNC 130 sends a PhysicalChannelReconfiguration (PCR) message for a DL cell change to the MS 110. That is, as receiving the EVENT1D measurement report message, the RNC 130 determines that there is a need for a DL cell change to the BS B 120b, and sends the MS the PCR message instructing the DL cell change to the BS B 120b. At this time, although not illustrated in FIG. 2, prior to sending the PCR message, the RNC 130 sends a notification of a cell change of the MS 110, to the BS A 120a and the BS B 120b beforehand. That is, the RNC 130 instructs the BS A 120a to release a DL data channel for the MS 110, and the BS B 120b to allocate a DL data channel to the MS 110. Thus, the BS A 120a and BS B 120b do not recognize the PCR message, and the PCR message is forwarded from the RNC 130 to the MS 110. The PCR message is configured to instruct establishment, reconfiguration, or release for a physical channel possessed by an MS 110. The PCR message includes Information Elements (IEs) representing an instruction for each UL channel and DL channel. In other words, the RNC 130 sends a PCR message including, as a value of instructing the cell change to the BS B 120b, an IE for instructing a cell change of an established DL channel. Here, the PCR message can be substituted with a RadioBearerReconfiguration (RBR) message for the purpose of cell change. For example, the PCR message can include IEs shown in Table 1 below.

TABLE 1

| Element/Group name | Need | Multi | Type and reference | Semantics description | Version |
|---|---|---|---|---|---|
| Message Type | MP | | Message Type | | |
| UE Information Elements | | | | | |
| RRC transaction identifier | MP | | RRC transaction identifier 10.3.3.36 | | |
| Integrity check info | CH | | Integrity check info 10.3.3.16 | | |
| Integrity protection mode info | OP | | Integrity protection mode info 10.3.3.19 | The UTRAN should not include this IE unless it is performing an SRNS relocation | |
| Ciphering mode info | OP | | Ciphering mode info 10.3.3.5 | The UTRAN should not include this IE unless it is performing an SRNS relocation and a change in ciphering algorithm | |
| Activation time | MD | | Activation time 10.3.3.1 | Default value is "now" | |

TABLE 1-continued

| Element/Group name | Need | Multi | Type and reference | Semantics description | Version |
|---|---|---|---|---|---|
| Delay restriction flag | OP | | Enumerated (TRUE) | This IE is always set to TRUE and included if the activation time is restricted according to subclause 8.6.3.1 | REL-6 |
| New U-RNTI | OP | | U-RNTI 10.3.3.47 | | |
| New C-RNTI | OP | | C-RNTI 10.3.3.8 | | |
| New DSCH-RNTI | OP | | DSCH-RNTI 10.3.3.9a | Should not be set in FDD. If received the UE should ignore it | |
| New H-RNTI | OP | | H-RNTI 10.3.3.14a | | REL-5 |
| CHOICE mode | MP | | | | REL-7 |
| >FDD | | | | | REL-7 |
| >>New Primary E-RNTI | OP | | E-RNTI 10.3.3.10a | | REL-6 |
| >>New Secondary E-RNTI | OP | | E-RNTI 10.3.3.10a | | REL-6 |
| >TDD | | | | | REL-7 |
| >>New E-RNTI | | | E-RNTI 10.3.3.10a | | REL-7 |
| RRC State Indicator | MP | | RRC State Indicator 10.3.3.35a | | |
| UE Mobility State Indicator | CV-FACH_PCH | | Enumerated (High-mobility Detected) | Absence of this IE implies that, according to [4], the UE shall consider itself being not in high mobility state after the state transition, if applicable. | REL-7 |
| UTRAN DRX cycle length coefficient | OP | | UTRAN DRX cycle length coefficient 10.3.3.49 | | |
| CN Information Elements | | | | | |
| CN Information info | OP | | CN Information info 10.3.1.3 | | |
| UTRAN mobility information elements | | | | | |
| URA identity | OP | | URA identity 10.3.2.6 | | |
| RNC support for change of UE capability | OP | | Boolean | Should be included if the message is used to perform an SRNS relocation | REL-7 |
| Reconfiguration in response to requested change of UE capability | OP | | Enumerated (TRUE) | | REL-7 |
| RB information elements | | | | | |
| Downlink counter synchronisation info | OP | | | | |
| >RB with PDCP information list | OP | 1 to <max RB all RABs> | | | |

TABLE 1-continued

| Element/Group name | Need | Multi | Type and reference | Semantics description | Version |
|---|---|---|---|---|---|
| >>RB with PDCP information | MP | | RB with PDCP information 10.3.4.22 | This IE is needed for each RB having PDCP in the case of lossless SRNS relocation | |
| | OP | | | | REL-5 |
| >>PDCP context relocation info | OP | | PDCP context relocation info 10.3.4.1a | This IE is needed for each RB having PDCP and performing PDCP context relocation | REL-5 |
| PhyCH information elements | | | | | |
| Frequency info | OP | | Frequency info 10.3.6.36 | | |
| DTX-DRX timing information | OP | | DTX-DRX timing information 10.3.6.34b | | REL-7 |
| Multi-frequency Info | OP | | Multi-frequency Info 10.3.6.39a | This IE is used for 1.28 Mcps TDD only | REL-7 |
| DTX-DRX Information | OP | | DTX-DRX Information 10.3.6.34a | | REL-7 |
| HS-SCCH less Information | OP | | HS-SCCH less Information 10.3.6.36ab | | REL-7 |
| MIMO parameters | OP | | MIMO parameters 10.3.6.41a | | REL-7 |
| Uplink radio resources | | | | | |
| Maximum allowed UL TX power | MD | | Maximum allowed UL TX power 10.3.6.39 | Default value is the existing value of the maximum allowed UL TX power | |
| Uplink DPCH info | OP | | Uplink DPCH info 10.3.6.88 | | |
| E-DCH Info | OP | | E-DCH Info 10.3.6.97 | | REL-6 |
| Downlink radio resources | | | | | |
| Downlink HS-PDSCH Information | OP | | Downlink HS_PDSCH Information 10.3.6.23a | | REL-5 |
| Downlink information common for all radio links | OP | | Downlink information common for all radio links 10.3.6.24 | | |
| Downlink information per radio link list | OP | 1 to <max RL> | | Send downlink information for each radio link | |
| >Downlink information for each radio link | MP | | Downlink information for each radio link 10.3.6.27 | | |
| MBMS PL Service Restriction Information | OP | | Enumerated (TRUE) | | REL-6 |

In case that the PCR message is configured as in Table 1 above, in order to instruct a DL cell change, the RNC 130 sets the IEs such as 'New H-RNTI', 'Downlink HS-PDSCH Information', 'Downlink information common for all radio links', 'Downlink information per radio link list', 'downlink information for each radio link', 'MBMS PL service Restriction Information', and so forth.

As the DL cell change is instructed from the RNC 130, the MS 110 changes a DL cell and then, in step 215, sends a PCR complete message to the RNC 130. By doing so, a DL serving BS of the MS 110 changes from the BS A 120a to the BS B 120b. Here, the PCR complete message is a message reporting completion of physical channel processing instructed by the PCR message, and is delivered from the MS 110 to the RNC 130.

Then, in step 217, the RNC 130 determines a UL cell change according to the SIR information received from the BS A 120a and the BS B 120b. A detailed process of the UL cell change is described below with reference to FIG. 6.

Thus, in step 219, the RNC 130 sends a PCR message for a UL cell change to the MS 110. That is, the RNC 130 determining the UL cell change to the BS B 120b sends the MS 110 the PCR message instructing the UL cell change to the BS B 120b. The PCR message is to instruct physical channel establishment, reconfiguration, or release for a physical channel possessed by an MS 110. The PCR message includes IEs representing instructions for respective UL channels and DL channels. In other words, the RNC 130 sends a PCR message including, as a value of instructing the cell change to the BS B 120b, an IE for instructing a cell change of an established UL channel. Here, the PCR message can be substituted with an RBR message for the purpose of cell change. For example, the PCR message can include the IEs shown in Table 1 above. In case that the PCR message is configured as in Table 1 above, in order to instruct a UL cell change, the RNC sets the IEs such as 'New E-RNTI', 'Maximum allowed UL TX power', 'Uplink DPCH info', 'E-DCH Info', and the like.

As the UL cell change is instructed from the RNC 130, the MS 110 changes a UL cell and then, in step 221, sends a PCR complete message to the RNC 130. By doing so, a UL serving BS of the MS 110 changes from the BS A 120a to the BS B 120b. Thus, the BS B 120b takes charge of scheduling for UL communication of the MS 110 and, based on feedback information received from the BS B 120b, the MS controls the UL communication. Here, the PCR complete message is a message reporting completion of physical channel processing instructed by the PCR message, and is delivered from the MS 110 to the RNC 130.

Then, in step 223, upon recognizing the occurrence of EVENT1B, the MS 110 sends an EVENT1B measurement report message to the RNC 130. That is, as recognizing the occurrence of EVENT1B, the MS 110 determines that a channel with the BS B 120b is superior to a channel with the BS A 120a, and reports the occurrence of EVENT1B to the RNC 130.

Thus, the RNC 130 determines to drop the link with the BS A 120a and, in step 225, sends an active set update message to the MS 110. Here, the active set implies a set of BSs which the MS 110 can have links with, namely, receive signals from. That is, as receiving the report of the occurrence of EVENT1B, the RNC 130 determines that the MS 110 does not need to maintain the link with the BS A 120a, and sends the active set update message instructing MS 110 to drop the link with the BS A 120a, namely, instructing to delete the BS A 120a from the active set.

In step 227, after updating the active set as receiving the active set update message, the MS 110 sends an active set update complete message to the RNC 130. That is, the MS 110 drops the link with the BS A 120a by deleting the BS A 120a from the active set of the MS 110, and maintains only the link with the BS B 120b. Thus, a control channel and UL channel between the MS 110 and the BS A 120a are released. Additionally, to report an active set update completion to the RNC 130, the MS 110 sends the active set update complete message to the RNC 130. By doing so, the MS 110 completes handover.

In the first exemplary embodiment described with reference to FIG. 2, after the DL cell change is made, the UL cell change is made. In FIG. 2, a description is made assuming that requirements for the DL cell change are first satisfied. If requirements for the UL cell change are first satisfied, the UL cell change can be made first. That is, there is no priority between the DL cell change and the UL cell change, and the cell changes are made under independent requirements, respectively.

According to a second exemplary implementation of the present invention, UL cell change timing is determined as follows.

If an MS continuously measuring a DL Ec/No recognizes the occurrence of 'EVENT1A', the MS reports the Ec/No measurement results of a BS A 120a and a BS B 120b to an RNC 130, and initiates a soft handover. Here, an object of the soft handover is a UL channel and a control channel. Thus, the BS A 120a and the BS B 120b all receive UL packets from the MS 110, determine a success or failure of packet reception, and send an ACKnowledge/Non-ACK (ACK/NACK) to the MS 110.

The BS A 120a observes a history of the ACK/NACK sent to the MS 110. At this time, if NACKs being continuous or of the number equal to or greater than a threshold value are generated during a preset Transmission Timing Interval (TTI), the BS A 120a reports this to an RNC 130. Here, a 'serving cell NACK indicator' is a definition of a parameter of indicating that the NACKs being continuous or of the number equal to or greater than a threshold value are generated during the TTI. That is, if the NACKs being continuous or of the number equal to or greater than a threshold value are generated during the TTI, the BS A 120a sends the RNC 130 the serving cell NACK indicator that is set to 'TRUE'. Also, in consideration of conditions of a better UL wireless environment, if ACKs are generated continuously during a TTI, the BS A 120a reports this to the RNC 130. That is, if the ACKs are generated continuously during the TTI, the BS A 120a sends the RNC 130 the serving cell NACK indicator that is set to 'FALSE'. Here, the TTIs each corresponding to the serving cell NACK indicator set to 'TRUE' and the serving cell NACK indicator set to 'FALSE' can have different values. Here, a 'Serving_Cell_Nack_Counter' can denote a parameter of indicating an expiration time of the TTI for setting the serving cell NACK indicator to 'TRUE' in the BS A 120a, and a 'Serving_Cell_Ack_Counter' can denote a parameter of indicating an expiration time of the TTI for setting the serving cell NACK indicator to 'FALSE'.

The BS B 120b observes a history of the ACK/NACK sent to the MS 110. At this time, if ACKs being continuous or of the number equal to or greater than a threshold value are generated during a TTI, the BS B 120b reports this to the RNC 130. Here, a 'target cell ACK indicator' is a definition of a parameter of indicating that the ACKs being continuous or of the number equal to or greater than a threshold value are generated during the TTI. That is, if the ACKs being continuous or of the number equal to or greater than a threshold value are generated during the TTI, the BS B 120b sends the RNC 130 the target cell ACK indicator that is set to 'TRUE'. Also, in consideration of conditions of a worse UL wireless environment, if NACKs are generated continuously during a TTI, the BS B 120*b* reports this to the RNC 130. That is, if the NACKs are generated continuously during the TTI, the BS B 120*b* sends the RNC 130 the target cell ACK indicator that is set to 'FALSE'. Here, a 'Non_Serving_Cell_Ack_Counter' can denote a parameter of indicating an expiration time of the TTI for setting the target cell ACK indicator to 'TRUE' in the BS B 120*b*, and a 'Non_Serving_Cell_Nack_Counter' can denote a parameter of indicating an expiration time of the TTI for setting the target cell ACK indicator to 'FALSE'. Additionally, the TTIs each corresponding to the target cell ACK indicator set to 'TRUE' and the target cell ACK indicator set to 'FALSE' can have different values.

Accordingly, the RNC 130 determines UL handover timing of the MS 110 depending on the serving cell NACK indicator and the target cell ACK indicator. Namely, if the serving cell NACK indicator set to 'TRUE' and the target cell ACK indicator set to 'TRUE' are all received, the RNC 130 sends the BS A 120*a* and the BS B 120*b* an instruction of a UL cell change of the MS 110.

Figure 3:
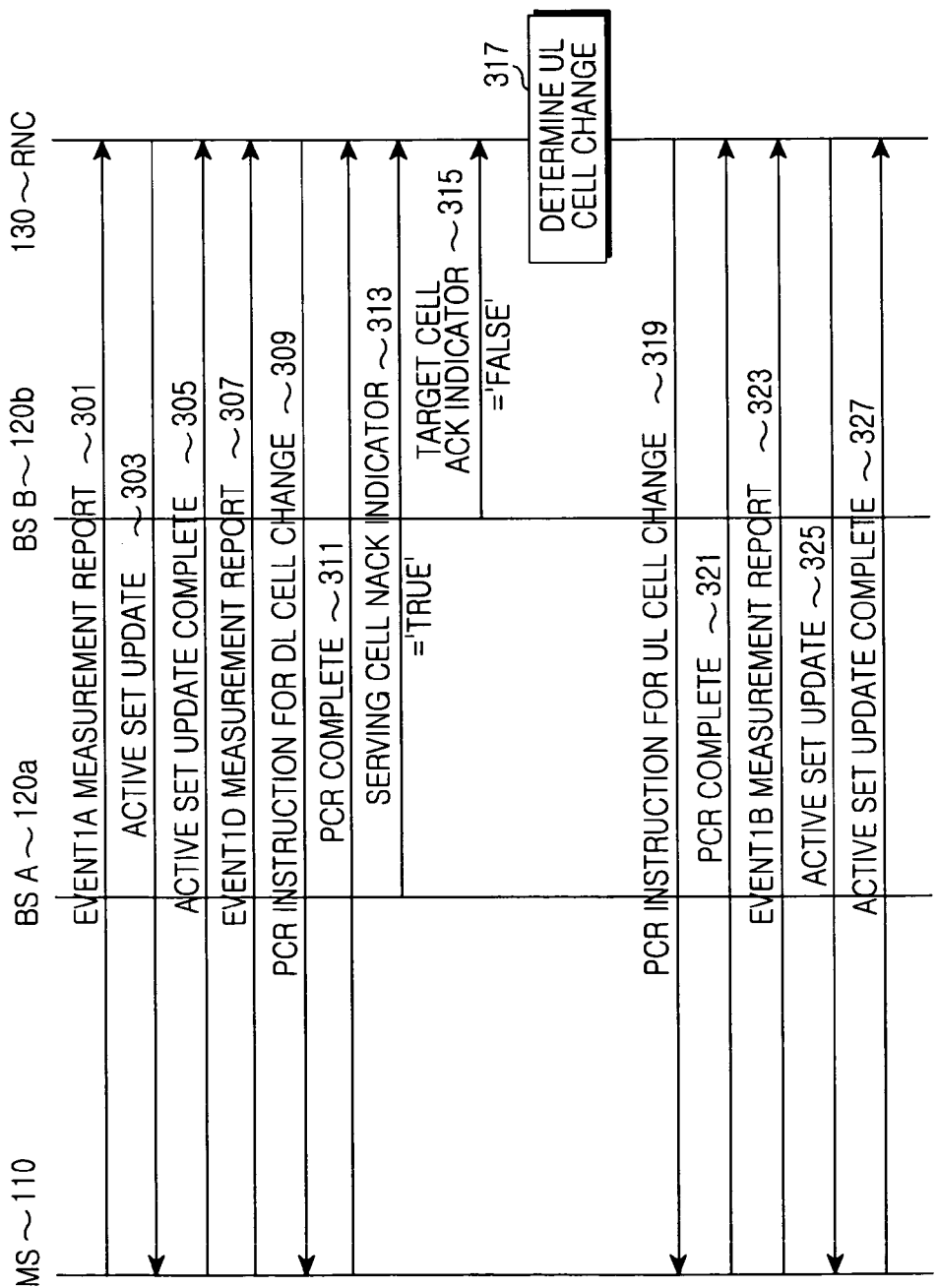
FIG. 3 illustrates a ladder diagram of a signal exchange for cell change in a high speed wireless communication system according to a second exemplary embodiment of the present invention.

FIG. 3 illustrates a signal exchange for handover according to a second exemplary embodiment of the present invention. FIG. 3 illustrates a process of changing a serving BS from a BS A to a BS B.

Referring to FIG. 3, in step 301, upon recognizing the occurrence of EVENT1A, an MS 110 sends an EVENT1A measurement report message to an RNC 130. That is, as recognizing the occurrence of EVENT1A, the MS 110 determines to acquire a link with the BS B 120*b*, and reports the occurrence of EVENT1A to the RNC.

Thus, in step 303, the RNC 130 sends an active set update message to the MS 110. Here, the active set implies a set of BSs with which the MS 110 can have links, namely, receive signals from. That is, as receiving the report of the occurrence of EVENT1A, the RNC 130 determines that the MS 110 needs to perform handover, and sends the MS 110 the active set update message instructing to set a link of the BS B 120*b*, namely, instructing to include the BS B 120*b* in the active set. The active set update message includes a channelization code for the BS B 120*b*, a scrambling code, and the like. At this time, although not illustrated, the RNC 130 instructs the BS B 120*b* to allocate the MS 110 a new link and then, if its completion is reported, the RNC 130 sends the MS 110 the active set update message.

In step 305, after updating the active set as receiving the active set update message, the MS 110 sends an active set update complete message to the RNC 130. That is, the MS 110 acquires the link with the BS B 120*b* by including the BS B 120*b* in the active set of the MS 110, and maintains both a link with the BS A 12A and the link with the BS B 10B. Here, the link with the BS A 120*a* and link with the BS B 120*b* include a control channel and UL channel. Additionally, to report an active set update completion to the RNC 130, the MS 110 sends the active set update complete message to the RNC 130. By acquiring the link with the BS B 120*b* through steps 301 to 305, the MS 110 initiates a soft handover.

After that, in step 307, upon recognizing the occurrence of EVENT1D, the MS 110 sends an EVENT1D measurement report message to the RNC 130. That is, as recognizing the occurrence of EVENT1D, the MS 110 recognizes a similarity between a channel with the BS B 120*b* and a channel with the BS A 120*a* and, to report this, the MS 110 sends the EVENT1D measurement report message to the RNC 130.

Thus, in step 309, the RNC 130 sends a PCR message for a DL cell change to the MS 110. That is, as receiving the EVENT1D measurement report message, the RNC 130 determines that a need exists for a DL cell change to the BS B 120*b*, and sends the MS 110 the PCR message instructing the DL cell change to the BS B 120*b*. At this time, although not illustrated in FIG. 3, prior to sending the PCR message, the RNC 130 sends a notification of a cell change of the MS 110, to the BS A 120*a* and the BS B 120*b* beforehand. That is, the RNC 130 instructs the BS A 120*a* to release a DL data channel for the MS 110, and the BS B 120*b* to allocate a DL data channel to the MS 110. Thus, the BS A 120*a* and BS B 120*b* do not recognize the PCR message, and the PCR message is forwarded from the RNC to the MS 110. The PCR message is to instruct establishment, reconfiguration, or release for a physical channel possessed by an MS 110. The PCR message includes IEs representing instructions for respective UL channels and DL channels. In other words, the RNC 130 sends a PCR message including, as a value of instructing the cell change to the BS B 120, an IE for instructing a cell change of an established DL channel. Here, the PCR message can be substituted with an RBR message for the purpose of cell change. For example, the PCR message can include the IEs shown in Table 1 above. In case that the PCR message is configured as in Table 1 above, in order to instruct a DL cell change, the RNC sets the IEs such as 'New H-RNTI', 'Downlink HS-PDSCH Information', 'Downlink information common for all radio links', 'Downlink information per radio link list', 'downlink information for each radio link', 'MBMS PL service Restriction Information', and so forth.

As the DL cell change is instructed from the RNC 130, the MS 110 changes a DL cell and then, in step 311, sends a PCR complete message to the RNC 130. By doing so, a DL serving BS of the MS 110 changes from the BS A 120*a* to the BS B 120*b*. Here, the PCR complete message is a message reporting completion of physical channel processing instructed by the PCR message, and is delivered from the MS 110 to the RNC 130.

Thereafter, in step 313, upon recognizing that NACKs being continuous or of the number equal to or greater than a threshold value are generated during a TTI, the BS A 120*a* sends the RNC 130 a serving cell NACK indicator set to 'TRUE'. Also, in step 315, upon recognizing that ACKs continuous or of the number equal to or greater than a threshold value are generated during a TTI, the BS B 120*b* sends the RNC 130 a target cell ACK indicator set to 'TRUE'. Thus, in step 317, the RNC 130 determines a UL cell change. A detailed process of the UL cell change using the serving cell NACK indicator and the target cell ACK indicator is described below in detail with reference to FIG. 8.

Thus, in step 319, the RNC 130 sends a PCR message for a UL cell change to the MS 110. That is, the RNC 130 determining the UL cell change to the BS B 120*b* sends the MS 110 the PCR message instructing the UL cell change to the BS B 120*b*. The PCR message is to instruct establishment, reconfiguration, or release for a physical channel possessed by an MS 110. The PCR message includes IEs representing instructions for respective UL channels and DL channels. In other words, the RNC 130 sends a PCR message including, as a value of instructing the cell change to the BS B 120*b*, an IE for instructing a cell change of an established UL channel. Here, the PCR message can be substituted with an RBR message for the purpose of cell change. For example, the PCR message can include the IEs shown in Table 1 above. In case that the PCR message is configured as in Table 1 above, in order to instruct a UL cell change, the RNC sets the IEs such as 'New E-RNTI', 'Maximum allowed UL TX power', 'Uplink DPCH info', 'E-DCH Info', and the like.

As the UL cell change is instructed from the RNC, the MS 110 changes a UL cell and then, in step 321, sends a PCR complete message to the RNC 130. By doing so, a UL serving BS of the MS changes from the BS A 120a to the BS B 120b. Thus, the BS B 120b takes charge of scheduling for UL communication of the MS 110 and, based on feedback information received from the BS B 120b, the MS 110 controls the UL communication. Here, the PCR complete message is a message reporting completion of physical channel processing instructed by the PCR message, and is delivered from the MS 110 to the RNC 130.

Then, in step 323, upon recognizing the occurrence of EVENT1B, the MS 110 sends an EVENT1B measurement report message to the RNC 130. That is, as recognizing the occurrence of EVENT1B, the MS 110 determines that a channel with the BS B 120b is superior to a channel with the BS A 120a, and reports the occurrence of EVENT1B to the RNC 130.

Thus, the RNC 130 determines to drop the link with the BS A 120a and, in step 325, sends an active set update message to the MS 110. Here, the active set implies a set of BSs which the MS 110 can have links with, namely, receive signals from. That is, as receiving the report of the occurrence of EVENT1B, the RNC 130 determines that the MS 110 does not need to maintain the link with the BS A 120a, and sends the active set update message instructing MS 110 to drop the link with the BS A 120a, namely, instructing to delete the BS A 120a from the active set.

In step 327, after updating the active set as receiving the active set update message, the MS 110 sends an active set update complete message to the RNC 130. That is, the MS 110 drops the link with the BS A 120a by deleting the BS A 120a from the active set of the MS 110, and maintains only the link with the BS B 120b. Thus, a control channel and UL channel between the MS 110 and the BS A 120a are released. Additionally, to report an active set update completion to the RNC 130, the MS 110 sends the active set update complete message to the RNC 130. By doing so, the MS 110 completes handover.

In the second exemplary embodiment described with reference to FIG. 3, after the DL cell change is made, the UL cell change is made. In FIG. 3, a description is made assuming that requirements for the DL cell change are first satisfied. If requirements for the UL cell change are first satisfied, the UL cell change can be made first. That is, there is no priority between the DL cell change and the UL cell change, and the cell changes are made under independent requirements, respectively.

According to a third exemplary implementation of the present invention, UL cell change timing is determined as follows.

If an MS 110 continuously measuring a DL Ec/No recognizes the occurrence of 'EVENT1A', the MS 110 reports the Ec/No measurement results of a BS A 120a and a BS B 120b to an RNC 130, and initiates a soft handover. Here, an object of the soft handover is a UL channel and a control channel. Thus, the BS A 120a and the BS B 120b each receive UL packets from the MS 110, determine a success or failure of packet reception, and send an ACK/NACK to the MS 110.

At this time, the RNC 130 determines UL handover timing of the MS 110 on the basis of ACK generation ratios of the BS A 120a and the BS B 120b. More particularly, the BS A 120a and the BS B 120b calculate the ACK generation ratios, and periodically report the ACK generation ratios to the RNC 130. Here, a 'Serving_Cell_Ack_Ratio' can denote a parameter for the ACK generation ratio report of the BS A, and a 'Non_Serving_Cell_Ack_Ratio' can denote a parameter for the ACK generation ratio report of the BS B 120b. Thus, if a state of a higher ACK generation ratio of the BS B 120b than an ACK generation ratio of the BS A 120a is maintained during a predetermined time interval, the RNC 130 sends the BS A 120a and BS B 120b an instruction of a UL cell change of the MS 110. Here, a 'UL_Ack_Ratio_Cell_Timer_To_T-rigger' can denote a parameter of indicating an expiration time of a timer for identifying the predetermined time interval.

Figure 4:
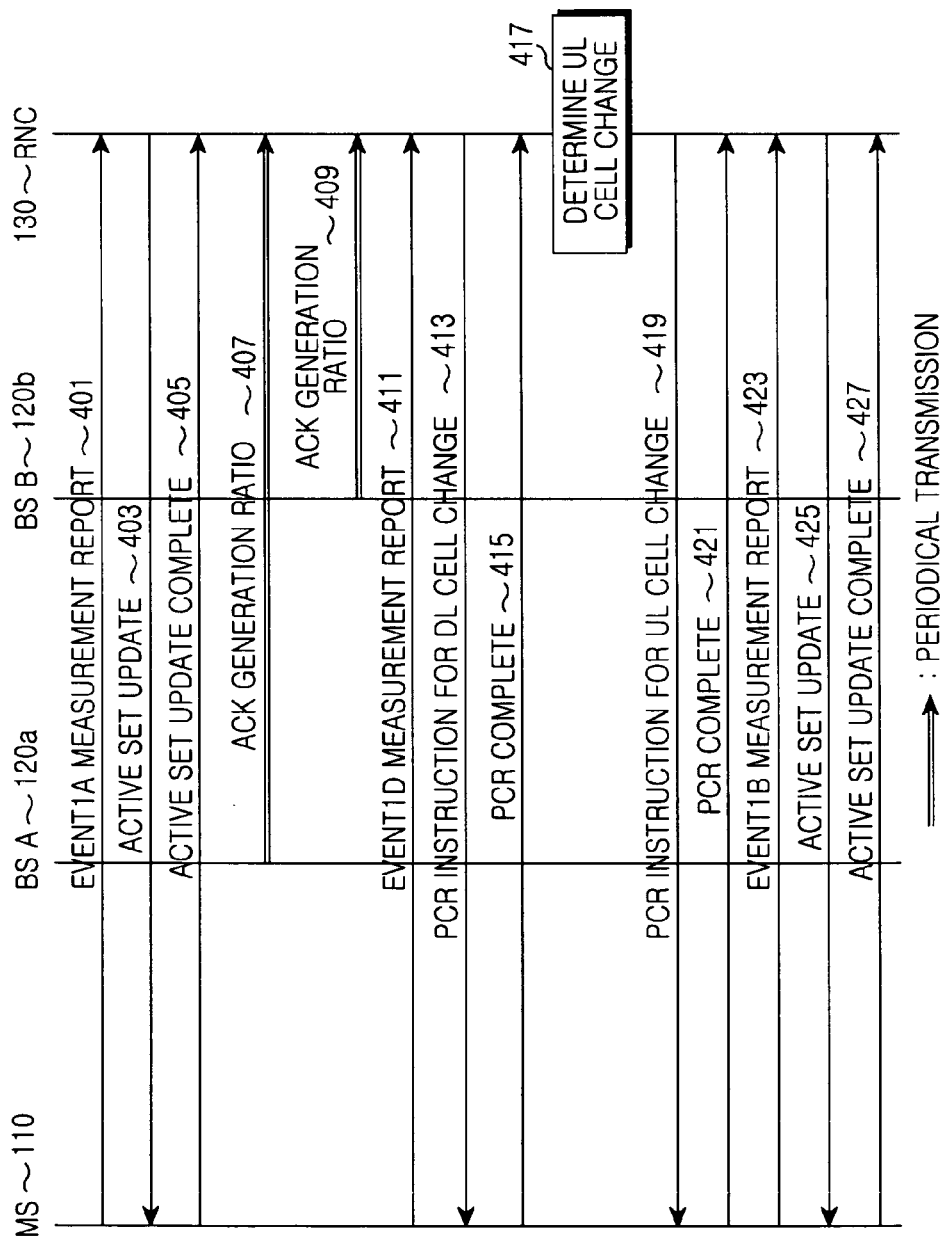
FIG. 4 illustrates a ladder diagram of a signal exchange for cell change in a high speed wireless communication system according to a third exemplary embodiment of the present invention.

FIG. 4 illustrates a signal exchange for handover according to a third exemplary embodiment of the present invention. FIG. 4 illustrates a process of changing a serving BS from a BS A 120a to a BS B 120b.

Referring to FIG. 4, in step 401, upon recognizing the occurrence of EVENT1A, an MS 110 sends an EVENT1A measurement report message to an RNC 130. That is, as recognizing the occurrence of EVENT1A, the MS 110 determines to acquire a link with the BS B 120b, and reports the occurrence of EVENT1A to the RNC 130.

Thus, in step 403, the RNC 130 sends an active set update message to the MS 110. Here, the active set implies a set of BSs with which the MS 110 can have links, namely, receive signals from. That is, as receiving the report of the occurrence of EVENT1A, the RNC 130 determines that the MS 110 needs to perform handover, and sends the MS 110 the active set update message instructing to set a link of the BS B 120b, namely, instructing to include the BS B 120b in the active set. The active set update message includes a channelization code for the BS B 120b, a scrambling code, and the like. At this time, although not illustrated, the RNC 130 instructs the BS B 120b to allocate the MS 110 a new link and then, if its completion is reported, the RNC 130 sends the MS 110 the active set update message.

In step 405, after updating the active set as receiving the active set update message, the MS 110 sends an active set update complete message to the RNC 130. That is, the MS 110 acquires the link with the BS B 120b by including the BS B 120b in the active set of the MS 110, and maintains both a link with the BS A 120a and the link with the BS B 120b. Here, the link with the BS A 120a and link with the BS B 120b include a control channel and UL channel. Additionally, to report an active set update completion to the RNC 130, the MS 110 sends the active set update complete message to the RNC 130. By acquiring the link with the BS B 120b through steps 401 to 405, the MS 110 initiates a soft handover.

In steps 407 to 409, the BS A 120a and BS B 120b, initiating the soft handover, periodically calculate ACK generation ratios for UL packets from the MS 110, and send the calculated ACK generation ratios to the RNC 130. Although not illustrated in FIG. 4, the BS A 120a and the BS B 120b periodically send the ACK generation ratios until before a UL cell change is made.

Thereafter, in step 411, upon recognizing the occurrence of EVENT1D, the MS 110 sends an EVENT1D measurement report message to the RNC 130. That is, as recognizing the occurrence of EVENT1D, the MS 110 recognizes a similarity between a channel with the BS B 120b and a channel with the BS A 120a and, to report this, the MS 110 sends the EVENT1D measurement report message to the RNC 130.

Thus, in step 413, the RNC 130 sends a PCR message for a DL cell change to the MS 110. That is, as receiving the EVENT1D measurement report message, the RNC 130 determines that there is a need for a DL cell change to the BS B 120b, and sends the MS 110 the PCR message instructing the DL cell change to the BS B 120b. At this time, although not illustrated in FIG. 4, prior to sending the PCR message, the RNC 130 sends a notification of a cell change of the MS 110, to the BS A 120a and the BS B 120b beforehand. That is, the RNC 130 instructs the BS A 120a to release a DL data channel for the MS 110, and the BS B 120b to allocate a DL data channel to the MS 110. Thus, the BS A 120a and BS B 120b do not recognize the PCR message, and the PCR message is forwarded from the RNC 130 to the MS 110. The PCR message is to instruct establishment, reconfiguration, or release for a physical channel possessed by an MS 110. The PCR message includes IEs representing instructions for respective UL channels and DL channels. In other words, the RNC 130 sends a PCR message including, as a value of instructing the cell change to the BS B 120b, an IE for instructing a cell change of an established DL channel. Here, the PCR message can be substituted with an RBR message for the purpose of cell change. For example, the PCR message can include the IEs shown in Table 1 above. In case that the PCR message is configured as in Table 1 above, in order to instruct a DL cell change, the RNC sets the IEs such as 'New H-RNTI', 'Downlink HS-PDSCH Information', 'Downlink information common for all radio links', 'Downlink information per radio link list', 'downlink information for each radio link', 'MBMS PL service Restriction Information', and the like.

As the DL cell change is instructed from the RNC, the MS 110 changes a DL cell and then, in step 415, sends a PCR complete message to the RNC 130. By doing so, a DL serving BS of the MS 110 changes from the BS A 120a to the BS B 120b. Here, the PCR complete message is a message of reporting completion of physical channel processing instructed by the PCR message, and is delivered from the MS 110 to the RNC 130.

Thereafter, in step 417, the RNC 130 determines a UL cell change according to the ACK generation ratios received from the BS A 120a and the BS B 120b. A detailed process of the UL cell change using the ACK generation ratios is described below in detail with reference to FIG. 10.

Thus, in step 419, the RNC 130 sends a PCR message for a UL cell change to the MS 110. That is, the RNC 130 determining the UL cell change to the BS B 120b sends the MS 110 the PCR message instructing the UL cell change to the BS B 120b. The PCR message is to instruct establishment, reconfiguration, or release for a physical channel possessed by an MS 110. The PCR message includes IEs representing instructions for respective UL channels and DL channels. In other words, the RNC 130 sends a PCR message including, as a value of instructing the cell change to the BS B 120b, an IE for instructing a cell change of an established UL channel. Here, the PCR message can be substituted with an RBR message for the purpose of cell change. For example, the PCR message can include the IEs shown in Table 1 above. In case that the PCR message is configured as in Table 1 above, in order to instruct a UL cell change, the RNC sets the IEs such as 'New E-RNTI', 'Maximum allowed UL TX power', 'Uplink DPCH info', 'E-DCH Info', and the like.

As the UL cell change is instructed from the RNC 130, the MS 110 changes a UL cell and then, in step 421, sends a PCR complete message to the RNC 130. By doing so, a UL serving BS of the MS 110 changes from the BS A 120a to the BS B 120b. Thus, the BS B 120b takes charge of scheduling for UL communication of the MS 110 and, based on feedback information received from the BS B 120b, the MS 110 controls the UL communication. Here, the PCR complete message is a message reporting completion of physical channel processing instructed by the PCR message, and is delivered from the MS 110 to the RNC 130.

Then, in step 423, upon recognizing the occurrence of EVENT1B, the MS 110 sends an EVENT1B measurement report message to the RNC 130. That is, as recognizing the occurrence of EVENT1B, the MS 110 determines that a channel with the BS B 120b is superior to a channel with the BS A 120a, and reports the occurrence of EVENT1B to the RNC 130.

Thus, the RNC 130 determines to drop the link with the BS A 120a and, in step 425, sends an active set update message to the MS 110. Here, the active set implies a set of BSs with which the MS 110 can have links, namely, receive signals from. That is, as receiving the report of the occurrence of EVENT1B, the RNC 130 determines that the MS 110 does not need to maintain the link with the BS A 120a, and sends the active set update message of instructing to drop the link with the BS A 120a, namely, instructing to delete the BS A 120a from the active set.

In step 427, after updating the active set as receiving the active set update message, the MS 110 sends an active set update complete message to the RNC 130. That is, the MS 110 drops the link with the BS A 120a by deleting the BS A 120a from the active set of the MS 110, and maintains only the link with the BS B 120b. Thus, a control channel and UL channel between the MS 110 and the BS A 120a are released. Additionally, to report an active set update completion to the RNC 130, the MS 110 sends the active set update complete message to the RNC 130. By doing so, the MS 110 completes handover.

In the third exemplary embodiment described with reference to FIG. 4, after the DL cell change is made, the UL cell change is made. In FIG. 4, a description is made assuming that requirements for the DL cell change are first satisfied. If requirements for the UL cell change are first satisfied, the UL cell change can be made first. That is, there is no priority between the DL cell change and the UL cell change, and the cell changes are made under independent requirements, respectively.

Operations and constructions of a BS 120 and an RNC 130 for determining UL handover timing as above are described below in detail with reference to the accompanying drawings.

Figure 5:
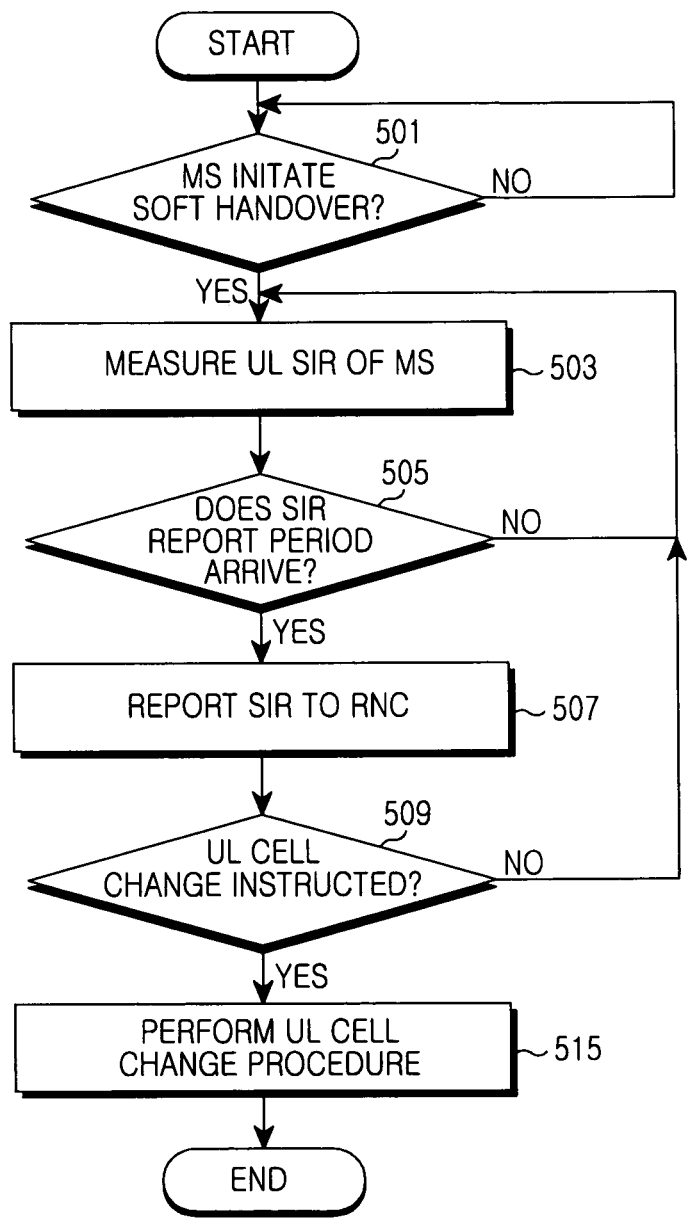
FIG. 5 illustrates an UpLink (UL) cell change procedure of a Base Station (BS) in a high speed wireless communication system according to a first exemplary embodiment of the present invention.

FIG. 5 illustrates a UL cell change procedure of a BS 120 in a high speed wireless communication system according to a first exemplary embodiment of the present invention. FIG. 5 illustrates an operation procedure of a serving BS or a target BS.

Referring to FIG. 5, in step 501, the BS 120 identifies if a soft handover of an MS 110 is initiated. Here, the soft handover is initiated by generation of an Ec/No measurement report of the MS 110 corresponding to EVENT1A, and yields to a control of an RNC 130. That is, the BS 120 identifies if the soft handover of the MS 110 is instructed from the RNC 130. Here, an object of the soft handover is a control channel and a UL channel.

If the soft handover of the MS 110 is initiated, the BS 120 proceeds to step 503 and measures a UL SIR of the MS 110. For example, the BS 120 measures the SIR using a pilot signal received through a Dedicated Physical Control Channel (DPCCH).

Then, the BS 120 proceeds to step 505 and identifies if an SIR report period arrives. Namely, the BS 120 periodically reports the SIR to the RNC. If the SIR report period does not arrive, the BS 120 returns to step 503.

Alternatively, if the SIR report period arrives, the BS 120 proceeds to step 507 and reports the SIR to the RNC 130. For example, the BS 120 reports the SIR through an SIR value of a dedicated measurement report message.

The BS 120 proceeds to step 509 and identifies if a UL cell change is instructed from the RNC 130. The UL cell change is instructed by the RNC 130 through a cell change instruction message such as a PCR message, an RBR message, and the like. That is, the BS 120 identifies if the cell change instruction message is received. If the UL cell change is not instructed, the BS 120 returns to step 503.

Alternatively, if the UL cell change is instructed, the BS 120 proceeds to step 511 and performs a UL cell change procedure. That is, if the BS 120 is equal to a serving BS, the BS 120 delivers information necessary for scheduling to a target BS, changing to the target BS. Alternatively, if the BS 120 is equal to a target BS, the BS 120 receives information necessary for scheduling from a serving BS, changing to the serving BS.

Figure 6:
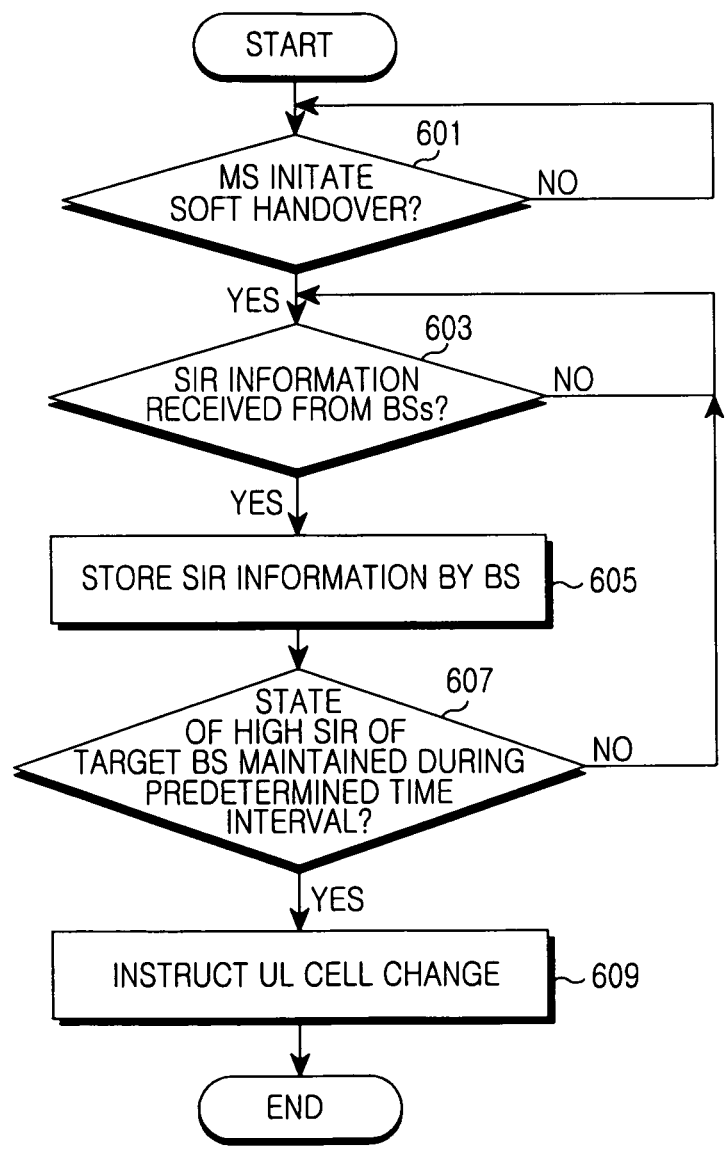
FIG. 6 illustrates a UL cell change procedure of a Radio Network Controller (RNC) in a high speed wireless communication system according to a first exemplary embodiment of the present invention.

FIG. 6 illustrates a UL cell change procedure of an RNC in a high speed wireless communication system according to a first exemplary embodiment of the present invention.

Referring to FIG. 6, in step 601, the RNC 130 identifies if a soft handover of an MS 110 is initiated. Here, the soft handover is initiated by generation of an Ec/No measurement report of the MS 110 corresponding to EVENT1A, and yields to a control of the RNC. That is, the RNC 130 identifies if the Ec/No measurement report of the MS 110 corresponding to EVENT1A is generated from the MS 110, and an instruction for the soft handover of the MS 110 is sent to a serving BS and a target BS.

If the soft handover of the MS 110 is initiated, the RNC 130 proceeds to step 603 and identifies if SIR information is received from the serving BS or the target BS. For example, the SIR is reported through an SIR value of a dedicated measurement report message.

If the SIR information is received, the RNC 130 proceeds to step 605 and stores the SIR information. At this time, the RNC 130 classifies and stores the SIR information by BS 120. That is, the RNC 130 stores the SIR information by BS 120 such that SIRs reported from respective BSs 120 can be compared with each other on a per-BS basis.

Then, the RNC 130 proceeds to step 607 and identifies if a state of a high SIR of the target BS is maintained during a predetermined time interval. That is, the RNC 130 compares the stored SIRs on a per-BS basis, and identifies if the state of the higher SIR of the target BS than the SIR of the serving BS is maintained during a predetermined time interval. If the state of the high SIR of the target BS is not maintained during a predetermined time interval, the RNC 130 returns to step 603.

Alternatively, if the state of the high SIR of the target BS is maintained during a predetermined time interval, the RNC 130 proceeds to step 609 and instructs a UL cell change. The UL cell change is instructed through a cell change instruction message such as a PCR message, an RBR message, and the like. That is, the RNC 130 determines to make a cell change of UL channels of the MS 110 to the target BS, and sends the cell change instruction message to the serving BS and the target BS.

Figure 7:
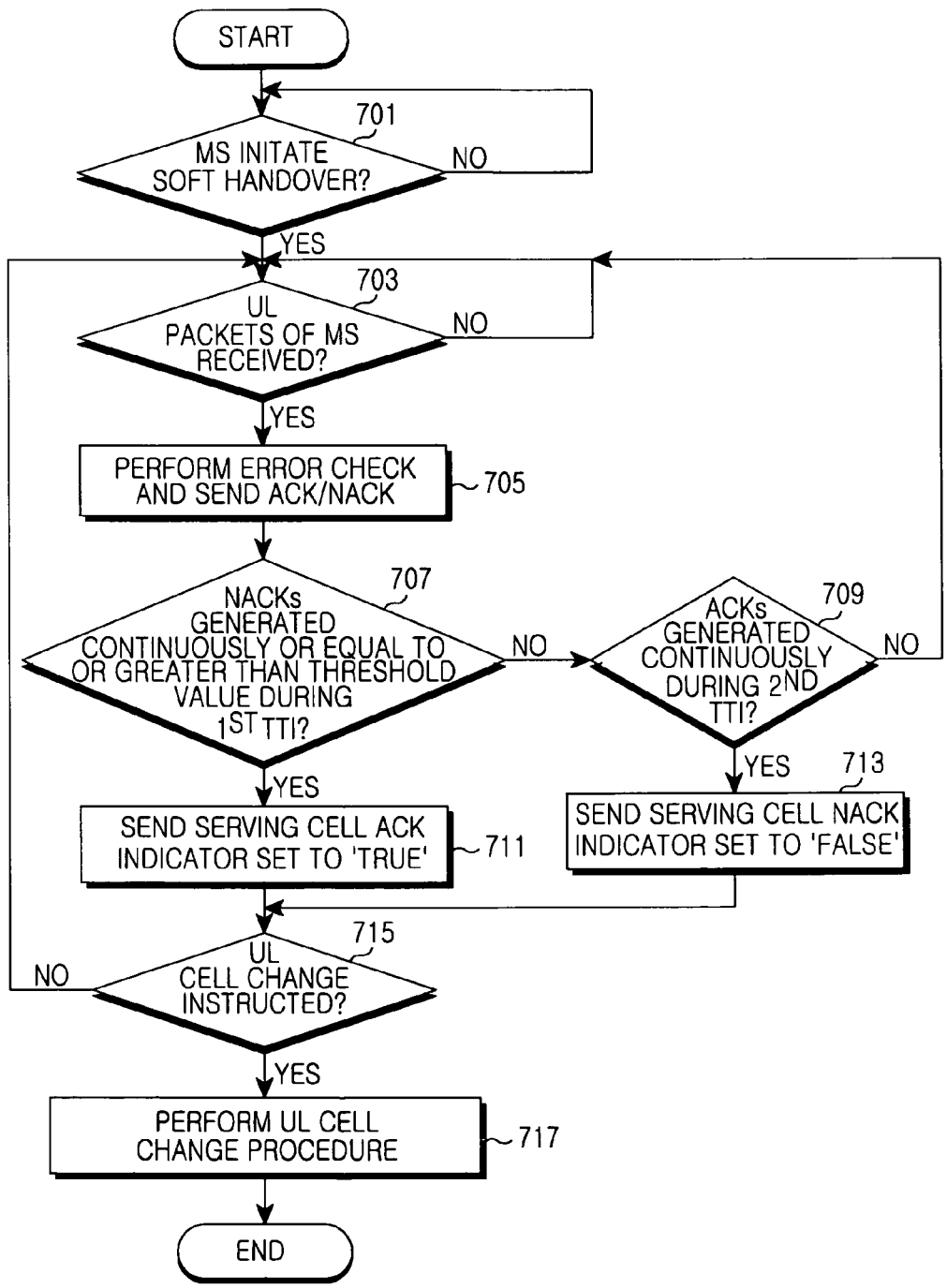
FIG. 7 illustrates a UL cell change procedure of a BS in a high speed wireless communication system according to a second exemplary embodiment of the present invention.

FIG. 7 illustrates a UL cell change procedure of a BS in a high speed wireless communication system according to a second exemplary embodiment of the present invention. FIG. 7 illustrates an operation procedure of a serving BS.

Referring to FIG. 7, in step 701, the BS 120 identifies if a soft handover of an MS 110 is initiated. Here, the soft handover is initiated by generation of an Ec/No measurement report of the MS 110 corresponding to EVENT1A, and yields to a control of an RNC 130. That is, the BS 120 identifies if the soft handover of the MS 110 is instructed from the RNC 130. Here, an object of the soft handover is a control channel and a UL channel.

If the soft handover of the MS 110 is initiated, the BS 120 proceeds to step 703 and identifies if UL packets of the MS 110 are received. In other words, the BS 120 identifies if packets are received from a UL data channel of the MS 110. That is, the BS 120 maintains a link with the MS 110, and receives and decodes a signal transmitted by the MS 110.

If the packets are received, the BS 120 proceeds to step 705 and performs an error check for the packets, and sends an ACK/NACK resulting from the error check result to the MS 110. In other words, the BS 120 determines an error or non-error through a CRC for the packets. If an error occurs, the BS 120 sends a NACK and, if an error does not occur, the BS 120 sends an ACK. For example, the BS 120 sends the ACK/NACK through an E-DCH Hybrid ARQ Indicator Channel (E-HICH).

Then, the BS 120 proceeds to step 707 and identifies if NACKs are generated continuously or equal to or greater than a threshold value during a first TTI. Here, the first TTI implies an ACK/NACK observation time for setting a serving cell NACK indicator to 'TRUE'. That is, if the ACK/NACK is sent, the BS 120 identifies if NACKs are generated continuously or equal to or greater than a threshold value during an interval from timing before the first TTI to current timing.

If the NACKs are not generated continuously or equal to or greater than a threshold value during the first TTI, the BS 120 proceeds to step 709 and identifies if ACKs are generated continuously during a second TTI. Here, the second TTI implies an ACK/NACK observation time for setting a serving cell NACK indicator to 'FALSE'. If the ACKs are not continuously generated during the second TTI, the BS 120 returns to step 703. That is, after sending the ACK/NACK, in steps 707 to 709, the BS 120 identifies if the NACKs are generated continuously or equal to or greater than a threshold value during the first TTI or if the ACKs are generated continuously during the second TTI.

If it is identified that the NACKs are generated continuously or equal to or greater than a threshold value during the first TTI in step 707, the BS 120 proceeds to step 711 and sends a serving cell NACK indicator set to 'TRUE'. Namely, the BS 120 sets the serving cell NACK indicator to 'TRUE', and sends the serving cell NACK indicator to the RNC 130. In other words, the BS 120 reports that a quality of a UL channel with the MS 110 gets worse.

If it is identified that the ACKs are generated continuously during the second TTI in step 709, the BS 120 proceeds to step 713 and sends a serving cell NACK indicator set to 'FALSE'. Namely, the BS 120 sets the serving cell NACK indicator to 'FALSE', and sends the serving cell NACK indicator to the RNC 130. In other words, the BS 120 reports that a quality of a UL channel with the MS 110 gets better.

Then, the BS 120 proceeds to step 715 and identifies if a UL cell change is instructed from the RNC 130. The UL cell change is instructed by the RNC 130 through a cell change instruction message such as a PCR message, an RBR message, and the like. That is, the BS 120 identifies if the cell change instruction message is received. If the UL cell change is not instructed, the BS 120 returns to step 703.

Alternatively, if the UL cell change is instructed, the BS 120 proceeds to step 717 and performs a UL cell change procedure. That is, if the BS 120 is equal to a serving BS, the BS 120 delivers information necessary for scheduling to a target BS, changing to the target BS. Alternatively, if the BS 120 is equal to a target BS, the BS 120 receives information necessary for scheduling from a serving BS, changing to the serving BS.

FIG. 7 illustrates the operation procedure of the serving BS according to the second exemplary embodiment of the present invention. Even an operation procedure of a target BS according to a second exemplary implementation of the present invention is similar with the operation procedure of FIG. 7. However, the target BS identifies if ACKs are generated continuously or equal to or greater than a threshold value during a first TTI in step 707, and identifies if NACKs are generated continuously during a second TTI in step 709. Additionally, the target BS sends a target cell ACK indicator set to 'TRUE' in step 711, and sends a target cell ACK indicator set to 'FALSE' in step 713.

Figure 8:
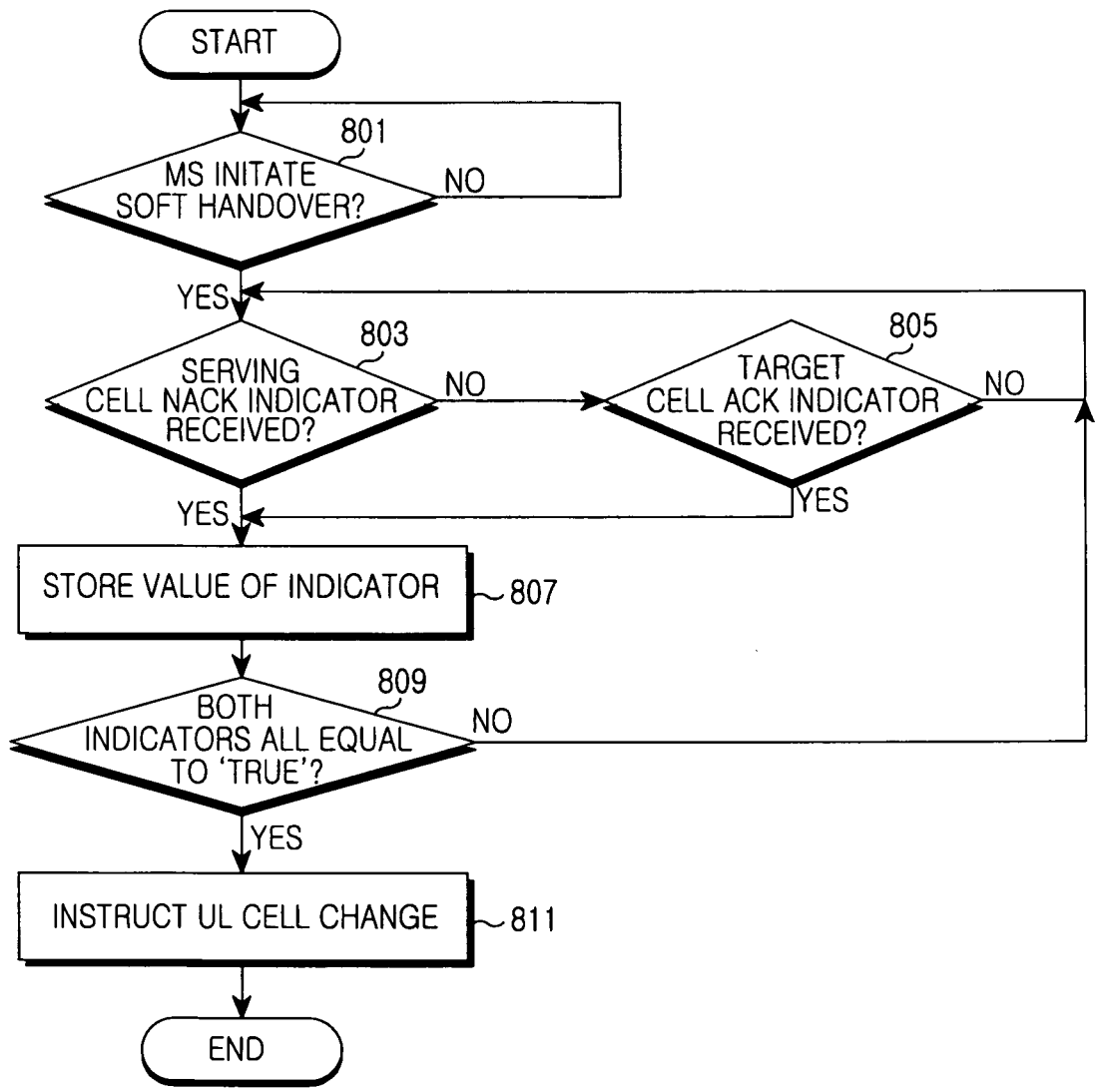
FIG. 8 illustrates a UL cell change procedure of an RNC in a high speed wireless communication system according to a second exemplary embodiment of the present invention.

FIG. 8 illustrates a UL cell change procedure of an RNC 130 in a high speed wireless communication system according to a second exemplary embodiment of the present invention.

Referring to FIG. 8, in step 801, the RNC 130 identifies if a soft handover of an MS 110 is initiated. Here, the soft handover is initiated by generation of an Ec/No measurement report of the MS 110 corresponding to EVENT1A, and yields to a control of the RNC 130. That is, the RNC 130 identifies if the Ec/No measurement report of the MS 110 corresponding to EVENT1A is generated from the MS 110, and an instruction for the soft handover of the MS 110 is sent to a serving BS and a target BS.

If the soft handover of the MS 110 is initiated, the RNC 130 proceeds to step 803 and identifies if a serving cell NACK indicator is received from the serving BS. The serving cell NACK indicator is a parameter of indicating generation of NACKs continuous or equal to or greater than a threshold value during a first TTI or generation of ACKs continuous during a second TTI. The serving cell NACK indicator is set to 'TRUE' or 'FALSE'. The serving cell NACK indicator set to 'TRUE' represents that NACKs are generated continuously or equal to or greater than a threshold value during the first TTI. The serving cell NACK indicator set to 'FALSE' represents that ACKs are generated continuously during the second TTI.

If the serving cell NACK indicator is not received, the RNC 130 proceeds to step 805 and identifies if a target cell ACK indicator is received from the target BS. The target cell ACK indicator is a parameter of indicating generation of ACKs continuous or equal to or greater than a threshold value during a first TTI or generation of NACKs continuous during a second TTI. The target cell ACK indicator is set to 'TRUE' or 'FALSE'. The target cell ACK indicator set to 'TRUE' represents that ACKs are generated continuously or equal to or greater than a threshold value during the first TTI. The target cell ACK indicator set to 'FALSE' represents that NACKs are generated continuously during the second TTI.

If the serving cell NACK indicator is received in step 803 or if the target cell ACK indicator is received in step 805, the RNC 130 proceeds to step 807 and stores a value of the serving cell NACK indicator or the target cell ACK indicator.

Then, the RNC 130 proceeds to step 809 and identifies if the stored value of the serving cell NACK indicator and the stored value of the target cell ACK indicator are all equal to 'TRUE'. At this time, when one of the value of the serving cell NACK indicator and the value of the target cell ACK indicator is not stored, or when at least one of the values of the two indicators is equal to 'FALSE', the RNC 130 returns to step 803.

Alternatively, if the values of the two indicators are all equal to 'TRUE', the RNC 130 proceeds to step 811 and instructs a UL cell change. The UL cell change is instructed through a PCR message. Namely, the RNC 130 determines to make a cell change of UL channels of the MS 110 to the target BS, and sends the PCR message to the MS 110.

Figure 9:
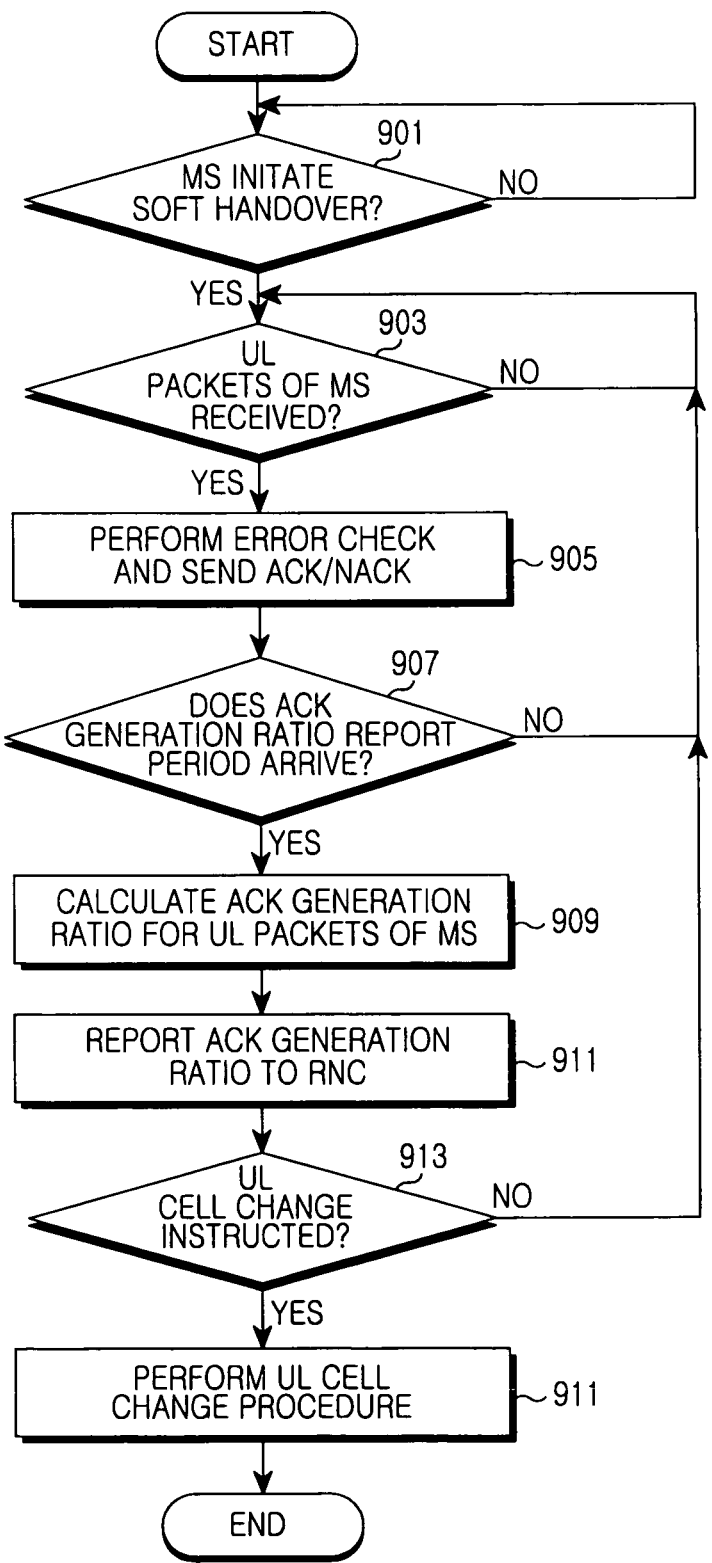
FIG. 9 illustrates a UL cell change procedure of a BS in a high speed wireless communication system according to a third exemplary embodiment of the present invention.

FIG. 9 illustrates a UL cell change procedure of a BS in a high speed wireless communication system according to a third exemplary embodiment of the present invention. FIG. 9 illustrates an operation procedure of a serving BS or a target BS.

Referring to FIG. 9, in step 901, the BS 120 identifies if a soft handover of an MS is initiated. Here, the soft handover is initiated by generation of an Ec/No measurement report of the MS 110 corresponding to EVENT1A, and yields to a control of an RNC 130. That is, the BS 120 identifies if the soft handover of the MS 110 is instructed from the RNC 130. Here, an object of the soft handover is a control channel and a UL channel.

If the soft handover of the MS 110 is initiated, the BS 120 proceeds to step 903 and identifies if UL packets of the MS 110 are received. In other words, the BS 120 identifies if packets are received from a UL data channel of the MS 110. That is, the BS 120 maintains a link with the MS 110, and receives and decodes a signal transmitted by the MS 110.

If the packets are received, the BS 120 proceeds to step 905 and performs an error check for the packets, and sends an ACK/NACK resulting from the error check result to the MS 110. In other words, the BS 120 determines an error or non-error through a CRC for the packets. If an error occurs, the BS 120 sends a NACK and, if an error does not occur, the BS 120 sends an ACK. For example, the BS 120 sends the ACK/NACK through an E-HICH.

Then, the BS 120 proceeds to step 907 and identifies if a report period of an ACK generation ratio arrives. The ACK generation ratio represents a ratio of generation of an ACK among an ACK/NACK for UL packets of an MS 110 that is in soft handover. The BS 120 periodically reports the ACK generation ratio to the RNC 130. If the report period of the ACK generation ratio does not arrive, the BS 120 returns to step 903.

Alternatively, if the report period of the ACK generation ratio arrives, the BS 120 proceeds to step 909 and calculates the ACK generation ratio, that is, the ratio of generation of the ACK among the ACK/NACK for the UL packets of the MS 110. In other words, the BS 120 calculates a frequency of generation of the ACK among the ACK/NACK for the UL packets of the MS 110.

After calculating the ACK generation ratio, the BS 120 proceeds to step 911 and reports the ACK generation ratio to the RNC 130. In other words, the BS 120 sends a parameter of representing a ratio of generation of an ACK among an ACK/NACK generated during one period for the ACK generation ratio report.

After reporting the ACK generation ratio, the BS 120 proceeds to step 913 and identifies if a UL cell change is instructed from the RNC 130. The UL cell change is instructed by the RNC 130 through a cell change instruction message such as a PCR message, an RBR message, and the like. That is, the BS 120 identifies if the cell change instruction message is received. If the UL cell change is not instructed, the BS 120 returns to step 903.

Alternatively, if the UL cell change is instructed, the BS 120 proceeds to step 915 and performs a UL cell change procedure. That is, if the BS 120 is equal to a serving BS, the BS 120 delivers information necessary for scheduling to a target BS, and changes to the target BS. Alternatively, if the BS 120 is equal to a target BS, the BS 120 receives information necessary for scheduling from a serving BS, and change to the serving BS.

Figure 10:
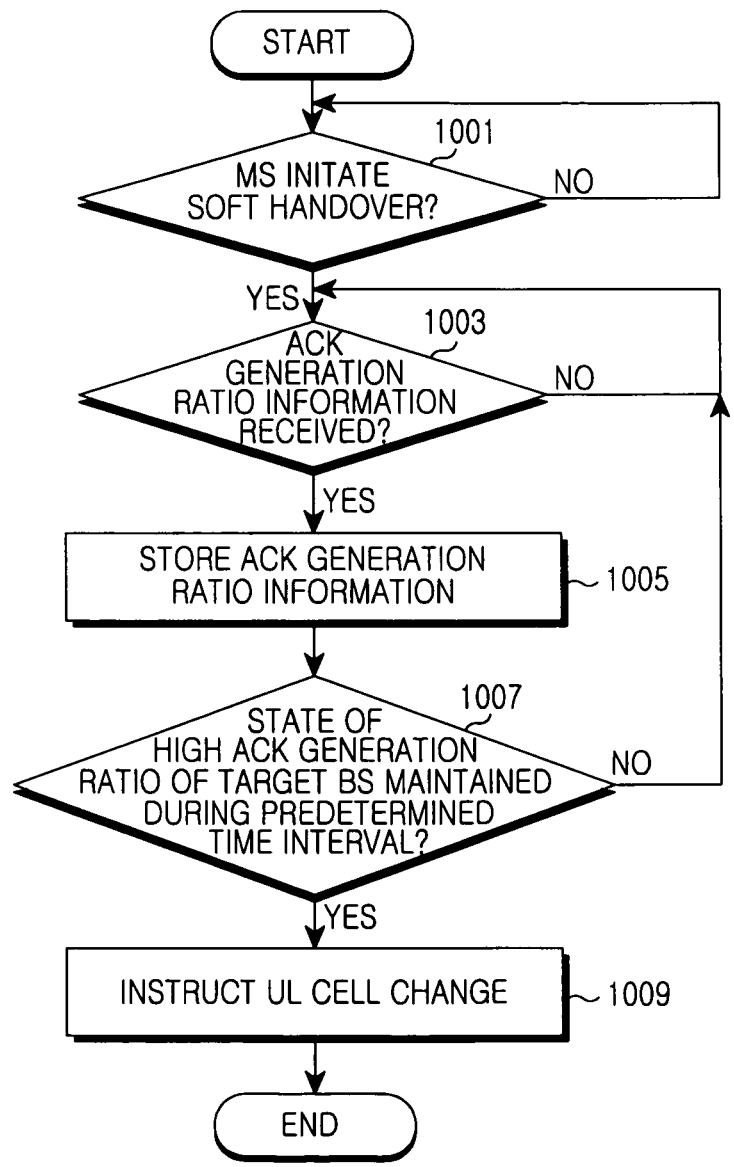
FIG. 10 illustrates a UL cell change procedure of an RNC in a high speed wireless communication system according to a third exemplary embodiment of the present invention.

FIG. 10 illustrates a UL cell change procedure of an RNC in a high speed wireless communication system according to a third exemplary embodiment of the present invention.

Referring to FIG. 10, in step 1001, the RNC 130 identifies if a soft handover of an MS 110 is initiated. Here, the soft handover is initiated by generation of an Ec/No measurement report of the MS corresponding to EVENT1A, and yields to a control of the RNC 130. That is, the RNC 130 identifies if the Ec/No measurement report of the MS 110 corresponding to EVENT1A is generated from the MS 110, and an instruction of the soft handover of the MS 110 is sent to a serving BS and a target BS.

If the soft handover of the MS 110 is initiated, the RNC 130 proceeds to step 1003 and identifies if ACK generation ratio information is received from the serving BS or the target BS. In other words, the RNC 130 identifies if a parameter of representing a ratio of generation of an ACK among an ACK/NACK generated during one period for an ACK generation ratio report.

If the ACK generation ratio information is received, the RNC 130 proceeds to step 1005 and stores the ACK generation ratio information. At this time, the RNC 130 classifies and stores the ACK generation ratio information by BS 120. Namely, the RNC 130 stores the ACK generation ratio information to observe a variation of an ACK generation ratio reported by each BS 120.

Then, the RNC 130 proceeds to step 1007 and identifies if a state of a high ACK generation ratio of the target BS is maintained during a predetermined time interval. That is, the RNC 130 compares the stored ACK generation ratio information on a per-BS basis, and identifies if a state of a higher ACK generation ratio of the target BS than an ACK generation ratio of the serving BS is maintained during a predetermined time interval. If the state of the high ACK generation ratio of the target BS is not maintained during a predetermined time interval, the RNC 130 returns to step 1003.

Alternatively, if the state of the high ACK generation ratio of the target BS is maintained during a predetermined time interval, the RNC 130 proceeds to step 1009 and instructs a UL cell change. The UL cell change is instructed through a cell change instruction message such as a PCR message, an RBR message, and the like. Namely, the RNC 130 determines to make a cell change of UL channels of the MS 110 to the target BS, and sends the cell change instruction message to the serving BS and the target BS.

Three exemplary embodiments of the present invention are described with reference to FIGS. 5 to 10. As described above, a BS reports one of an SIR, an ACK generation ratio, and a serving cell NACK indicator or target cell ACK indicator according to one of the exemplary embodiments of the present invention. In an exemplary embodiment of the present invention below, 'UL cell change determination information' generally denotes the ACK generation ratio, the serving cell NACK indicator or target cell ACK indicator, and the SIR.

Figure 11:
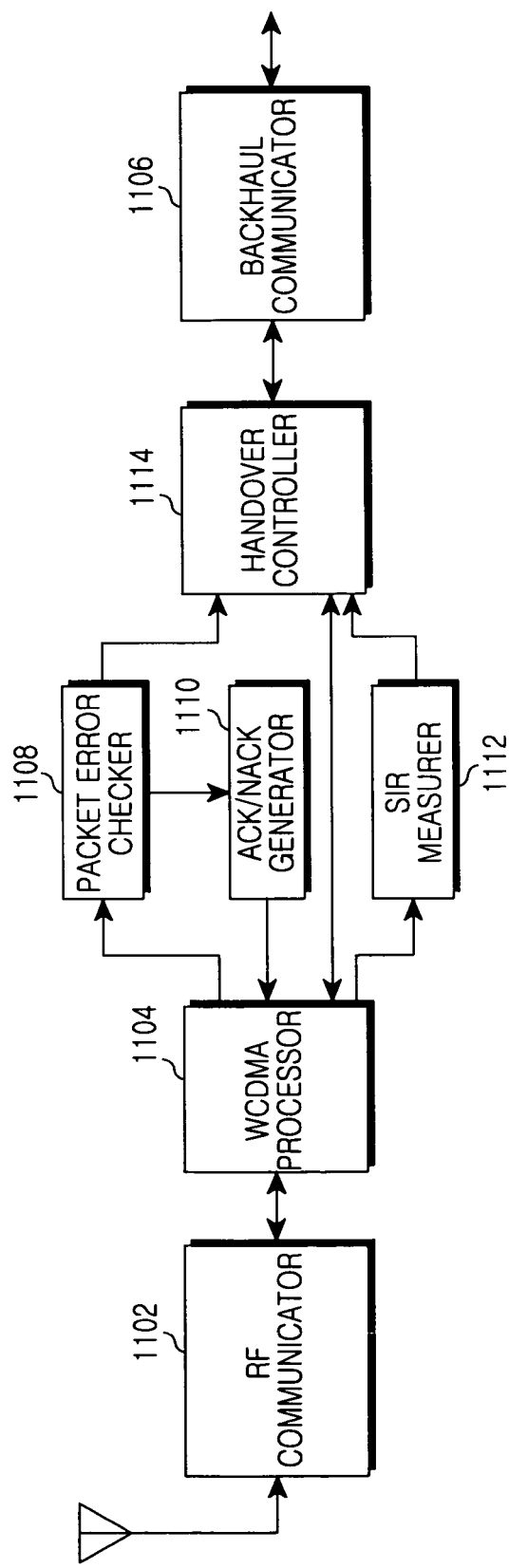
FIG. 11 illustrates a construction of a BS in a high speed wireless communication system according to an exemplary embodiment of the present invention.

FIG. 11 illustrates a construction of a BS in a high speed wireless communication system according to an exemplary embodiment of the present invention.

As illustrated in FIG. 11, the BS includes a Radio Frequency (RF) communicator 1102, a WCDMA processor 1104, a backhaul communicator 1106, a packet error checker 1108, an ACK/NACK generator 1110, an SIR measurer 1112, and a handover controller 1114.

The RF communicator 1102 performs a mutual conversion between an RF band signal transmitted/received through an antenna and a baseband signal. That is, the RF communicator 1102 down-converts and amplifies an RF signal received through the antenna and provides the amplified signal to the WCDMA processor 1104. The RF communicator 1102 up-converts and amplifies a baseband signal provided from the WCDMA processor 1104 and transmits the amplified signal through the antenna. In accordance with a WCDMA scheme, the WCDMA processor 1104 spreads a transmit bit stream and, in accordance with the WCDMA scheme, de-spreads a received signal and restores a receive bit stream. The backhaul communicator 1106 provides an interface for performing communication with the RNC through backhaul.

The packet error checker 1108 checks a success or failure of reception of UL packets received through a UL data channel from an MS. In other words, the packet error checker 1108 performs Cyclic Redundancy Check (CRC) for the UL packets, and sends a notification of the CRC result to both the ACK/NACK generator 1110 and the handover controller 1114. The packet error checker 1108 sends a notification of generation of an ACK/NACK for the MS to the handover controller 1114. The ACK/NACK generator 1110 generates an ACK/NACK depending on the UL packet reception success or failure check result of the packet error checker 1108, and provides the ACK/NACK to the WCDMA processor 1104. Namely, if the UL packets succeed in reception, the ACK/NACK generator 1110 generates an ACK and, if the UL packets fail in reception, the ACK/NACK generator 1110 generates a NACK. The SIR measurer 1112 measures an SIR for the MS using a pilot signal, and the like, received through a UL control channel.

The handover controller 1114 controls a function of processing handover of an MS. That is, the handover controller 1114 identifies an Ec/No report of the MS, and sends a notification of the Ec/No report of the MS to an RNC through the backhaul communicator 1106. Particularly, the handover controller 1114 generates UL cell change determination information on a UL cell change of the MS, and reports the UL cell change determination information to the RNC through the backhaul communicator 1106. Here, the UL cell change determination information includes one type of an ACK generation rate, a serving cell NACK indicator or target cell ACK indicator, and an SIR according to a detailed exemplary implementation of the present invention.

According to a first exemplary implementation of the present invention, the UL cell change determination information is comprised of an SIR. If a soft handover of the MS is initiated, the handover controller 1114 substantially continuously identifies SIRs notified from the SIR measurer 1112. At this time, if the SIR report period arrives, the handover controller 1114 reports the SIR to the RNC through the backhaul communicator 1106. Thereafter, if a UL cell change is instructed from the RNC, the handover controller 1114 performs a UL cell change procedure.

According to a second exemplary implementation of the present invention, the UL cell change determination information is comprised of the serving cell NACK indicator or the target cell ACK indicator. If a soft handover of the MS is initiated, the handover controller 1114 continuously identifies an ACK generation ratio for the MS according to ACK/NACK generation notified from the packet error checker 1108. At this time, when the BS is equal to a serving BS, if NACKs are generated continuously or equal to or greater than a threshold value during a first TTI, the handover controller 1114 sends a serving cell NACK indicator set to 'TRUE' through the backhaul communicator 1106. Alternatively, when the BS is equal to a target BS, if ACKs are generated continuously or equal to or greater than a threshold value during a first TTI, the handover controller 1114 sends a target cell ACK indicator set to 'TRUE' through the backhaul communicator 1106. If NACKs are generated continuously during a second TTI, the handover controller 1114 sends a serving cell ACK indicator set to 'FALSE' through the backhaul communicator 1106. Thereafter, if a UL cell change is instructed from the RNC, the handover controller 1114 performs a UL cell change procedure.

According to a third exemplary implementation of the present invention, the UL cell change determination information is comprised of an ACK generation ratio. If a soft handover of the MS is initiated, the handover controller 1114 continuously identifies an ACK generation ratio for the MS according to ACK/NACK generation notified from the packet error checker 1108. Additionally, if a report period of the ACK generation ratio arrives, the handover controller 1114 calculates the ACK generation ratio, that is, a ratio of generation of an ACK among an ACK/NACK for UL packets of the MS. After calculating the ACK generation ratio, the handover controller 1114 reports the ACK generation ratio to the RNC through the backhaul communicator 1106. Thereafter, if a UL cell change is instructed from the RNC, the handover controller 1114 performs a UL cell change procedure.

Figure 12:
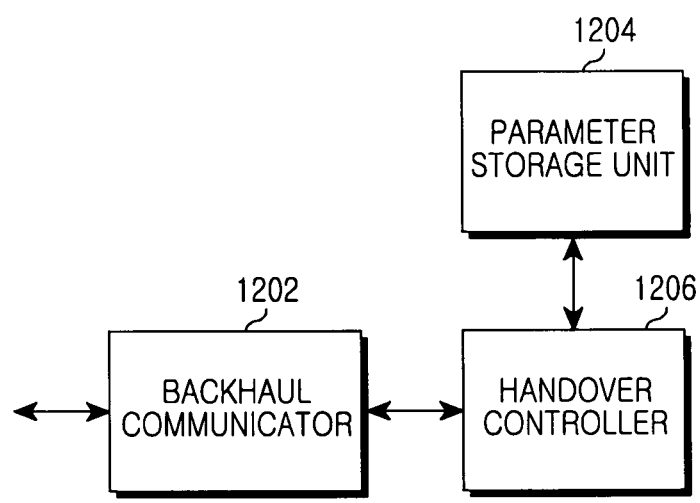
FIG. 12 illustrates a construction of an RNC in a high speed wireless communication system according to an exemplary embodiment of the present invention.

FIG. 12 illustrates a construction of an RNC in a high speed wireless communication system according to an exemplary embodiment of the present invention.

As illustrated in FIG. 12, the RNC includes a backhaul communicator 1202, a parameter storage unit 1204, and a handover controller 1206.

The backhaul communicator 1202 provides an interface for performing communication with BSs through a backhaul network. The parameter storage unit 1204 stores UL cell change determination information reported from the BSs for the sake of a UL cell change of an MS. The handover controller 1206 determines a UL cell change or non-change of the MS on the basis of the UL cell change determination information, and sends an instruction of the UL cell change, to BSs through the backhaul communicator 1202. Here, the UL cell change determination information has one type of an ACK generation ratio, a serving cell NACK indicator or target cell ACK indicator, and an SIR according to a detailed exemplary implementation of the present invention.

According to a first exemplary implementation of the present invention, the UL cell change determination information is comprised of an SIR. If a soft handover of an MS is initiated and SIR information are received from BSs, the handover controller 1206 stores the SIR information in the parameter storage unit 1204. At this time, if a state of a high SIR of a target BS is maintained during a predetermined time interval, the handover controller 1206 sends an instruction of a UL cell change, to the serving BS and the target BS through the backhaul communicator 1202.

According to a second exemplary implementation of the present invention, the UL cell change determination information is comprised of a serving cell NACK indicator or a target cell ACK indicator. If a soft handover of an MS is initiated and the serving cell NACK indicator is received from a serving BS or the target cell ACK indicator from a target BS, the handover controller 1206 stores a value of the serving cell NACK indicator or a value of the target cell ACK indicator in the parameter storage unit 1204. Additionally, the handover controller 1206 identifies if the stored value of the serving cell NACK indicator and the stored value of the target cell ACK indicator are all equal to 'TRUE'. At this time, if the values of the two indicators are all equal to 'TRUE', the handover controller 1206 sends an instruction of a UL cell change, to the serving BS and the target BS through the backhaul communicator 1202.

According to a third exemplary implementation of the present invention, the UL cell change determination information is comprised of an ACK generation ratio. If a soft handover of an MS is initiated and ACK generation ratio information is received from a serving BS or a target BS, the handover controller 1206 stores the ACK generation ratio information in the parameter storage unit 1204. At this time, the parameter storage unit 1204 classifies and stores the ACK generation ratio information by BS. Additionally, the handover controller 1206 identifies if a state of a high ACK generation ratio of the target BS is maintained during a predetermined time interval. If the state of the high ACK generation ratio of the target BS is maintained during a predetermined time interval, the handover controller 1206 sends an instruction of a UL cell change, to the serving BS and the target BS through the backhaul communicator 1202.

An exemplary embodiment of the present invention determines UL cell change timing by a criterion separate from that of DL cell change timing, thereby being capable of preventing a UL communication quality from being deteriorated when there is a coverage mismatch between a UL and a DL in a high speed wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for an operation of a base station (BS) in a high speed wireless communication system, the method comprising:
   in response to an uplink (UL) soft handover of a mobile station (MS) being initiated depending on a downlink (DL) channel quality of the MS, generating UL cell change determination information representing a UL channel quality of the MS;
   reporting the UL cell change determination information to a radio network controller (RNC); and
   in response to a UL cell change instructed from the RNC due to the generated UL channel quality, performing the UL cell change of the MS,
   wherein the UL cell change determination information comprises an indicator of indicating generation of Non-ACKs (NACKs) continuous or substantially similar to or more than a threshold value for UL packets of the MS or generation of ACKs continuous for the UL packets of the MS, and
   wherein the generating of the UL cell change determination information comprises:
   in response to the NACKs are generated continuously or substantially similar to or greater than a threshold value during a set first Transmission Timing Interval (TTI), generating the indicator set to 'TRUE'; and
   in response to the ACKs are generated continuously or substantially similar to or greater than a threshold value during a set second TTI, generating the indicator set to 'FALSE'.

2. A method for an operation of a base station (BS) in a high speed wireless communication system, the method comprising:
   in response to an uplink (UL) soft handover of a mobile station (MS) being initiated depending on a downlink (DL) channel quality of the MS, generating UL cell change determination information representing a UL channel quality of the MS;
   reporting the UL cell change determination information to a radio network controller (RNC); and
   in response to a UL cell change instructed from the RNC due to the generated UL channel quality, performing the UL cell change of the MS,
   wherein the UL cell change determination information comprises an indicator of indicating generation of ACKs continuous or substantially similar to or more than a threshold value for UL packets of the MS or indicating generation of NACKs continuous for the UL packets of the MS, and wherein the generating of the UL cell change determination information comprises:

in response to the ACKs are generated continuously or substantially similar to or greater than a threshold value during a set first TTI, generating the indicator set to 'TRUE'; and in response to the NACKs are generated continuously or substantially similar to or greater than a threshold value during a set second TTI, generating the indicator set to 'FALSE'.

3. A base station (BS) in a high speed wireless communication system, the BS comprising:

a controller configured to, in response to an uplink (UL) soft handover of a mobile station (MS) being initiated depending on a downlink (DL) channel quality of the MS, generate UL cell change determination information representing a UL channel quality of the MS; and a communicator configured to report the UL cell change determination information to a radio network controller (RNC), wherein the controller perfouns controller is configured to perform a UL cell change of the MS in response to a UL cell change instructed from the RNC due to the generated UL channel quality, wherein the UL cell change determination information comprises an indicator of indicating generation of Non-ACKs (NACKs) continuous or substantially similar to or more than a threshold value for UL packets of the MS or generation of ACKs continuous for the UL packets of the MS, and wherein the controller is configured to generate the indicator set to 'TRUE' in response to the NACKs are generated continuously or substantially similar to or greater than a threshold value during a set first Transmission Timing Interval (TTI), and generate the indicator set to 'FALSE' in response to the ACKs are generated greater than a threshold value during a set second TTI.

4. A base station (BS) in a high speed wireless communication system, the BS comprising:

a controller configured to, in response to an uplink (UL) soft handover of a mobile station (MS) being initiated depending on a downlink (DL) channel quality of the MS, generate UL cell change determination information representing a UL channel quality of the MS; and a communicator configured to report the UL cell change determination information to a radio network controller (RNC), wherein the controller performs controller is configured to perform a UL cell change of the MS in response to a UL cell change instructed from the RNC due to the generated UL channel quality, wherein the UL cell change determination information comprises an indicator of indicating generation of ACKs continuous or substantially similar to or more than a threshold value for UL packets of the MS or indicating generation of NACKs continuous for the UL packets of the MS, and wherein the controller is configured to generate the indicator set to 'TRUE' in response to the ACKs are generated continuously or substantially similar to or greater than a threshold value during a set first TTI, and generate the indicator set to 'FALSE' in response to the NACKs are generated continuously or substantially similar to or greater than a threshold value during a set second TTI.

* * * * *